(12) United States Patent
McGuire

(10) Patent No.: US 8,240,641 B2
(45) Date of Patent: Aug. 14, 2012

(54) ISOLATED AXIAL SUPPORT STRUT FOR SUPPORTING AN AXIAL LOAD AND AXIAL SUPPORT STRUT ISOLATOR

(75) Inventor: Dennis McGuire, Erie, PA (US)

(73) Assignee: Lord Corporation, Cary, NC (US)

( * ) Notice: Subject to any disclaimer, the term of this patent is extended or adjusted under 35 U.S.C. 154(b) by 1604 days.

(21) Appl. No.: 11/564,017

(22) Filed: Nov. 28, 2006

(65) Prior Publication Data
US 2010/0116965 A1 May 13, 2010

Related U.S. Application Data

(60) Provisional application No. 60/740,023, filed on Nov. 28, 2005.

(51) Int. Cl.
*F16F 9/10* (2006.01)
(52) U.S. Cl. ............................................ 267/33; 267/34
(58) Field of Classification Search .............. 267/33–35, 267/140.13, 221; 244/17.11–17.27, 54
See application file for complete search history.

(56) References Cited

U.S. PATENT DOCUMENTS
5,456,341 A * 10/1995 Garnjost et al. .............. 188/378
(Continued)

FOREIGN PATENT DOCUMENTS
EP 0447307 A1 9/1991
(Continued)

OTHER PUBLICATIONS
PCT International Search Report and Written Opinion for PCT/US2006/061287.
(Continued)

*Primary Examiner* — Christopher Schwartz
(74) *Attorney, Agent, or Firm* — Richard G. Miller

(57) ABSTRACT

A support strut includes a strut isolator with a first strut end member and a second strut end member, the second strut end distal from the first strut end. The first strut end member includes an outer rigid housing with an inner cavity. The second strut end member includes an inner rigid member extending into the outer rigid housing inner cavity and includes an inertial track extending in a direction from the first strut end towards the second strut end. The inertial track has a first entrance end proximate the first strut end and a second entrance end proximate the second strut end. The isolator includes a first outer tubular elastomer disposed between the outer rigid housing and the inner rigid member. The isolator includes a second inner end tubular elastomer disposed between the outer rigid housing and the inner rigid member proximate the second strut end. The isolator includes a third inner end tubular elastomer, the third inner end tubular elastomer disposed between the outer rigid housing and the inner rigid member proximate the first strut end. The isolator includes an isolator fluid in a first variable volume fluid chamber proximate the second strut end and the second track entrance end, and in a second variable volume fluid chamber proximate the first strut end and the first track entrance end. Movement of the first strut end member in a first strut direction towards the second strut end member plungers the fluid from the second variable volume chamber through the track towards the first variable volume chamber, and an opposite movement of the first strut end member in a second direction away from the second strut end plungers the fluid from the first variable volume chamber through the track towards the second variable volume chamber.

4 Claims, 15 Drawing Sheets

U.S. PATENT DOCUMENTS

| | | | | |
|---|---|---|---|---|
| 5,477,947 A | * | 12/1995 | Schalles et al. | 188/298 |
| 5,762,295 A | * | 6/1998 | McGuire et al. | 244/54 |
| 6,293,532 B2 | * | 9/2001 | McGuire | 267/140.13 |
| 6,378,851 B1 | * | 4/2002 | McGuire | 267/140.13 |
| 6,394,432 B1 | * | 5/2002 | Whiteford | 267/140.13 |

FOREIGN PATENT DOCUMENTS

| | | |
|---|---|---|
| EP | 1203898 A2 | 5/2002 |
| WO | 9743561 A | 11/1997 |
| WO | 9906732 A | 2/1999 |
| WO | 9906734 A | 2/1999 |

OTHER PUBLICATIONS

Paul T. Herbst and Gerald P. Whiteford, The Application of Fluidlastic® Isolators on Turbofan Engines, LL-6400, 1996, 11 pages, Lord Corporation, Erie, PA.

Dennis P. McGuire, Fluidlastic® Dampers and Isolators for Vibration Control in Helicopters, LL-6502, 1994, 12 pages, Lord Corporation, Erie, PA.

J.R. Podesta, User's Guide to the Application of Fluidlastic® Mounts, LL-7418, 1990, Lord Corporation, Erie, PA.

* cited by examiner

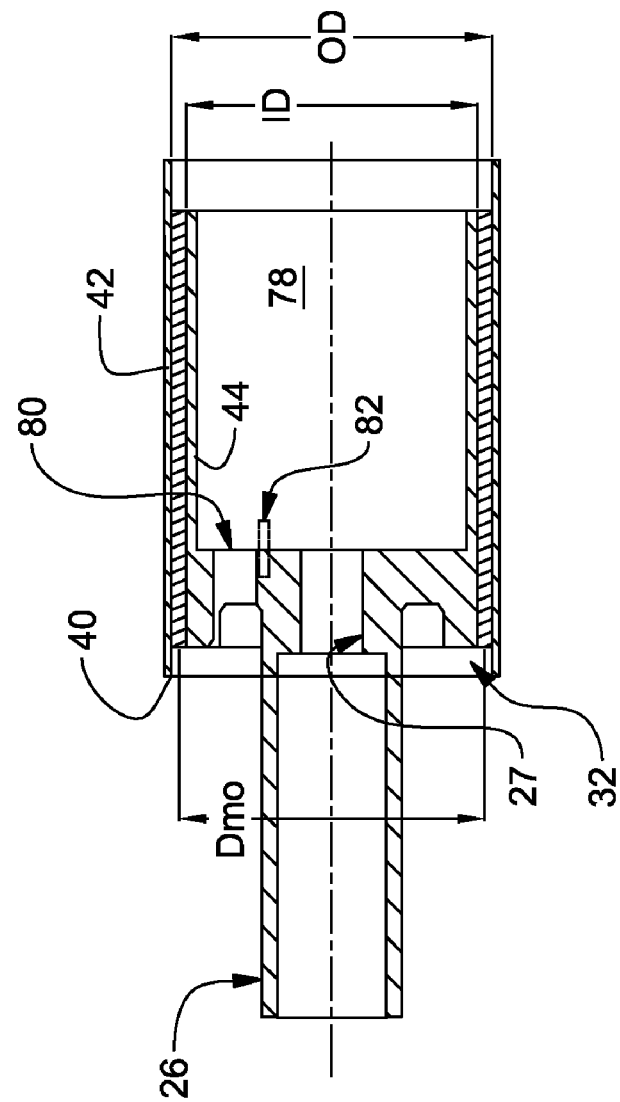
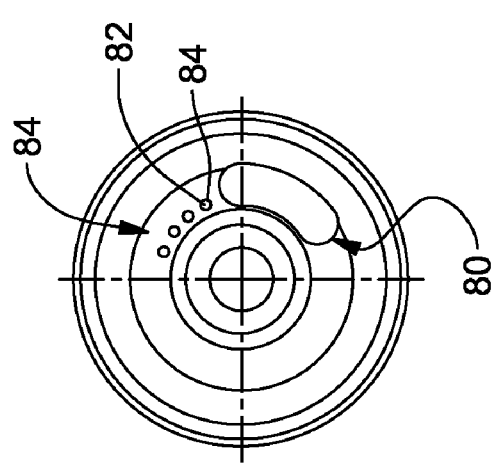
FIG. 7

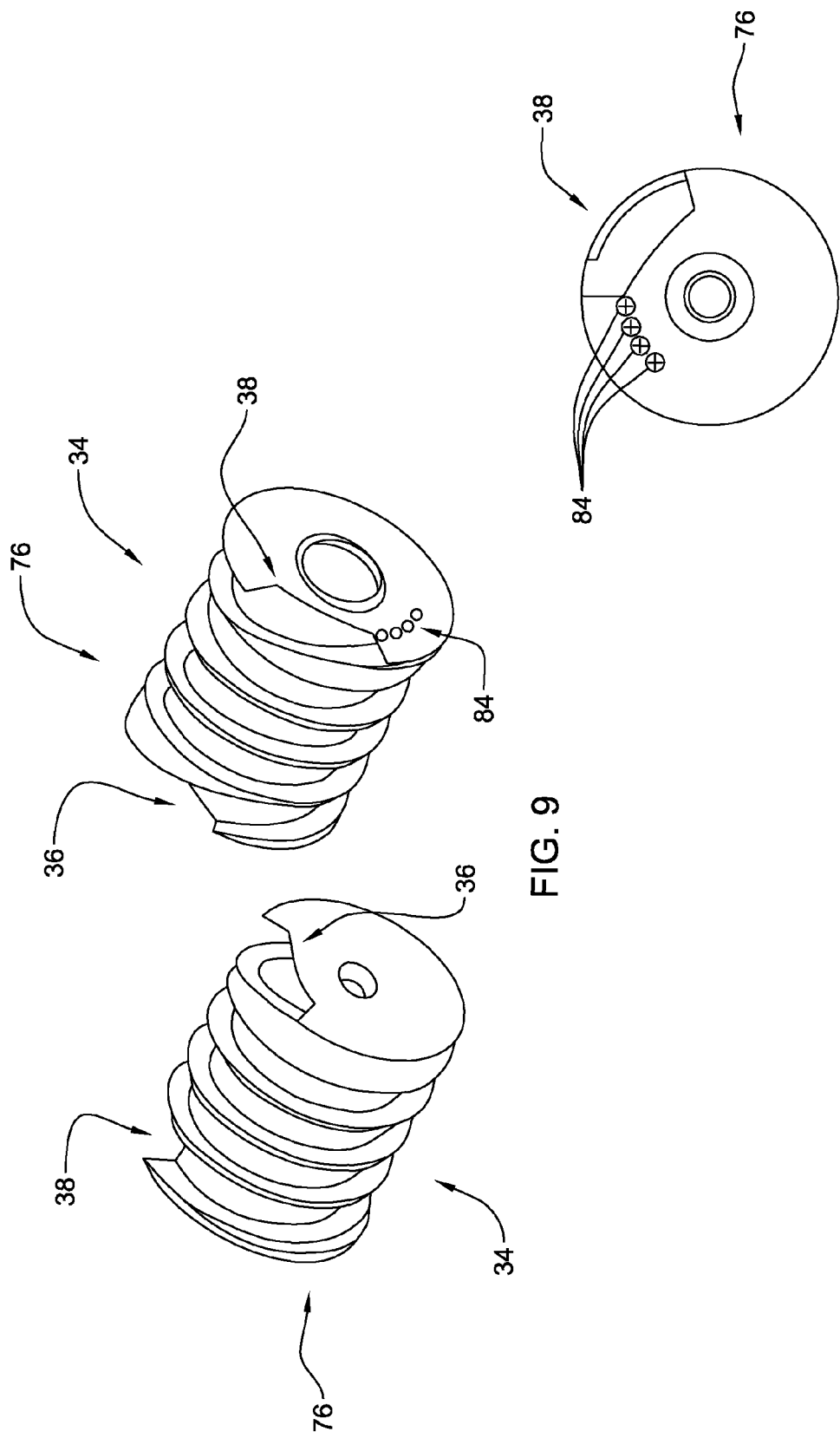

US 8,240,641 B2

ISOLATED AXIAL SUPPORT STRUT FOR SUPPORTING AN AXIAL LOAD AND AXIAL SUPPORT STRUT ISOLATOR

CROSS REFERENCE

This application claims the benefit of, and incorporates by reference, U.S. Provisional Patent Application No. 60/740,023 filed on Nov. 28, 2005.

FIELD OF THE INVENTION

The invention relates to the field of support struts for supporting an axial load and isolating troublesome vibrations. The invention relates to the field of isolated axial support struts for controlling vibrations and supporting loads. More particularly the invention relates to the field of supporting loads and isolating vibrations in aircrafts, and more particularly provides aircraft suspension systems with beneficial isolation and load carrying capacity.

BACKGROUND OF THE INVENTION

There is a need for isolated support struts for supporting an axial load while providing vibration isolation. There is a need for support strut isolators for isolating vibrations while supporting axial loads. There is a need for support struts and isolators which accurately and economically control and minimize vibrations. There is a need for an economically feasible method of making isolated suspension struts and aircraft suspension systems. There is a need for a robust suspension system and support isolators for isolating troublesome vibrations and carrying axial loads. There is a need for an economic aircraft suspension system providing beneficial tuned vibration isolation.

SUMMARY OF THE INVENTION

In an embodiment the invention includes a support strut for supporting an axial load. The support strut preferably includes a strut isolator with a first strut end member and a second strut end member, the second strut end distal from the first strut end. Preferably the first strut end member includes an outer rigid housing, the outer rigid housing defining an inner cavity. Preferably the second strut end member includes an inner rigid member, the inner rigid member extending into the outer rigid housing inner cavity with the inner rigid member including an inertial track extending in a direction from the first strut end towards the second strut end, the inertial track having a first entrance end proximate the first strut end and a second entrance end proximate the second strut end. Preferably the isolator includes a first outer tubular elastomer disposed between the outer rigid housing and the inner rigid member, the first outer tubular elastomer bonded to a first inner rigid surface of the outer rigid housing, the first outer tubular elastomer bonded to a first outer rigid surface of the inner rigid member. Preferably the isolator includes a second inner end tubular elastomer, the second inner end tubular elastomer disposed between the outer rigid housing and the inner rigid member proximate the second strut end, the second inner end tubular elastomer bonded to a second inner rigid surface of the outer rigid housing, the second inner tubular elastomer bonded to a second outer rigid surface of the inner rigid member. Preferably the isolator includes a third inner end tubular elastomer, the third inner end tubular elastomer disposed between the outer rigid housing and the inner rigid member proximate the first strut end, the third inner end tubular elastomer bonded to a third inner rigid surface of the outer rigid housing, the third inner tubular elastomer bonded to a third outer rigid surface of the inner rigid member. Preferably the isolator includes an isolator fluid with the second inner end tubular elastomer, the first outer tubular elastomer, the outer rigid housing, and the inner rigid member providing a first variable volume fluid chamber proximate the second strut end and the second track entrance end, the third inner end tubular elastomer, the first outer tubular elastomer, the outer rigid housing, and the inner rigid member providing a second variable volume fluid chamber proximate the first strut end and the first track entrance end. Movement of the first strut end member in a first strut direction plungers the fluid from the second variable volume chamber through the track towards the first variable volume chamber, and an opposite movement plungers the fluid from the first variable volume chamber through the track towards the second variable volume chamber.

In an embodiment the invention includes an isolator. The isolator preferably includes a first end member and a second end member, the second end distal from the first end. The first end member includes an outer rigid housing, the outer rigid housing defining an inner cavity. The second end member includes an inner rigid member, the inner rigid member extending into the outer rigid housing inner cavity, the inner rigid member including an inertial fluid track extending in a direction from the first end towards the second end, the inertial fluid track having a first entrance end proximate the first end and a second entrance end proximate the second end. The isolator preferably includes a first elastomer disposed between the outer rigid housing and the inner rigid member. The isolator preferably includes a second inner elastomer, the second inner elastomer disposed between the outer rigid housing and the inner rigid member proximate the second end. The isolator preferably includes an isolator fluid filling a first variable volume fluid chamber proximate the second end and the second track entrance end, and a distal second variable volume fluid chamber proximate the first end and the first track entrance end, wherein movement of the first end member in a first direction plungers the fluid from the second variable volume chamber through the track towards the first variable volume chamber, and an opposite movement plungers the fluid from the first variable volume chamber through the track towards the second variable volume chamber.

In an embodiment the invention includes a longitudinal isolator. The isolator preferably includes a first end member and a second end member, the second end opposite from the first end along a longitudinally extending axis. The first end member preferably includes an outer rigid longitudinally extending housing, the outer rigid longitudinally extending housing extending longitudinally towards the second end member. The outer rigid longitudinally extending housing preferably defines an interior cavity. The interior cavity contains a first variable volume fluid chamber proximate the second end and a distal second variable volume fluid chamber proximate the first end. The second end member preferably includes a rigid structural extension longitudinally extending from the isolator exterior into the interior cavity through the first variable volume chamber, the rigid structural extension including an inner rigid member. The inner rigid member includes an inertial fluid track extending in a direction from the first end towards the second end, the inertial fluid track having a first entrance end in fluid communication with the second variable volume chamber and a second entrance end in fluid communication with the first variable volume chamber.

The longitudinal isolator preferably includes an isolator fluid wherein a movement of the first end member in a first longitudinal direction towards the second end member plungers the fluid from the second variable volume chamber through the track towards the first variable volume chamber, and an opposite movement of the first end member in a second longitudinal direction away from the second end plungers the fluid from the first variable volume chamber through the track towards the second variable volume chamber.

In an embodiment the invention includes a support isolator. The isolator preferably having a first end member and a second end member, the second end opposite from the first end. The isolator preferably includes an isolator fluid. The isolator first end member includes an outer rigid longitudinally extending housing, the outer rigid longitudinally extending housing extending longitudinally towards the second end member, the outer rigid longitudinally extending housing defining an interior cavity. The interior cavity contains a first variable volume fluid chamber proximate the second end and a distal second variable volume fluid chamber proximate the first end. The isolator second end member includes a rigid structural extension longitudinally extending from the isolator exterior into the interior cavity. The rigid structural extension includes an inner rigid member, the inner rigid member including an inertial fluid track extending in a direction from the first end towards the second end, the inertial fluid track having a first entrance end in fluid communication with the second variable volume chamber and a second entrance end in fluid communication with the first variable volume chamber. The isolator preferably has a spring between the inner rigid member and the outer rigid housing providing a high static spring stiffness of at least 3,000 lbs/inch, wherein a movement of the first end member in a first longitudinal direction plungers the fluid from the second variable volume chamber through the track towards the first variable volume chamber, and an opposite movement of the first end member plungers the fluid from the first variable volume chamber through the track towards the second variable volume chamber.

In an embodiment the invention includes an aircraft suspension system for isolating an aircraft power unit. The aircraft suspension system preferably includes at least one isolated suspension support strut with a tuned isolator fluid inertial track with a tuned frequency isolation notch band, the frequency notch band centered about a center frequency, and having a notch band width, with the notch band width encompassing an aircraft power unit operation frequency.

In an embodiment the invention includes an aircraft suspension system for isolating an aircraft motive power unit having at least one aircraft motive power unit operation frequency. Preferably the aircraft power unit suspension system includes at least one longitudinal isolated suspension strut, wherein the isolated suspension strut includes a strut isolator having a tuned isolator fluid inertial track path with a tuned frequency isolation notch band. Preferably the tuned frequency isolation notch band has a notch band width, with the notch band width encompassing the at least one aircraft motive power unit operation frequency.

In an embodiment the invention includes a method of making an isolator. The method preferably includes providing an outer rigid housing with an inner cavity. The method preferably includes providing an inner rigid member and an inertial fluid track extending in a direction from a first end towards a second end, the inertial fluid track having a first entrance end proximate the first end and a second entrance end proximate the second end. The method preferably includes disposing the inner rigid member inside the outer rigid housing with the inner rigid member extending into the outer rigid housing inner cavity, with a first outer elastomer disposed between the outer rigid housing and the inner rigid member, a second inner end elastomer, the second inner end elastomer disposed between the outer rigid housing and the inner rigid member proximate the second end, the second inner end elastomer, the first outer elastomer, the outer rigid housing, and the inner rigid member providing a first variable volume fluid chamber proximate the second track entrance end. Preferably a distal second variable volume fluid chamber is provided proximate the first end. The method preferably includes providing an isolator fluid wherein a first direction movement plungers the fluid from the second variable volume chamber through the track towards the first variable volume chamber, and a second opposite direction movement plungers the fluid from the first variable volume chamber through the track towards the second variable volume chamber.

In an embodiment the invention includes a method of making an isolator strut. The method preferably includes providing an outer rigid housing with an inner cavity. The method preferably includes disposing an inner rigid member in the outer rigid housing inner cavity, the inner rigid member including an inertial fluid track extending in a direction from a first end towards a second end, the inertial fluid track having a first entrance end proximate the first end and a second entrance end proximate the second end, with the inner cavity containing a first variable volume fluid chamber proximate the second end and a distal second variable volume fluid chamber proximate the first end, the inner rigid member including a rigid structural external extension longitudinally extending out from the inner cavity through the first variable volume chamber. Preferably a spring is disposed between the inner rigid member and the outer rigid housing and provides a high static spring stiffness of at least 3,000 lbs/inch.

The method preferably includes providing an isolator fluid wherein a first movement plungers the fluid from the second variable volume chamber through the track towards the first variable volume chamber, and an opposite direction movement plungers the fluid from the first variable volume chamber through the track towards the second variable volume chamber.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principals and operation of the invention.

BRIEF DESCRIPTION OF THE DRAWINGS

FIG. 7 shows isolator component assemblies.
FIG. 9 shows views of an isolator component track core modular insert.

FIG. 10 shows an end view an isolator component track core modular insert.

DETAILED DESCRIPTION OF THE PREFERRED EMBODIMENT

Figure 1:
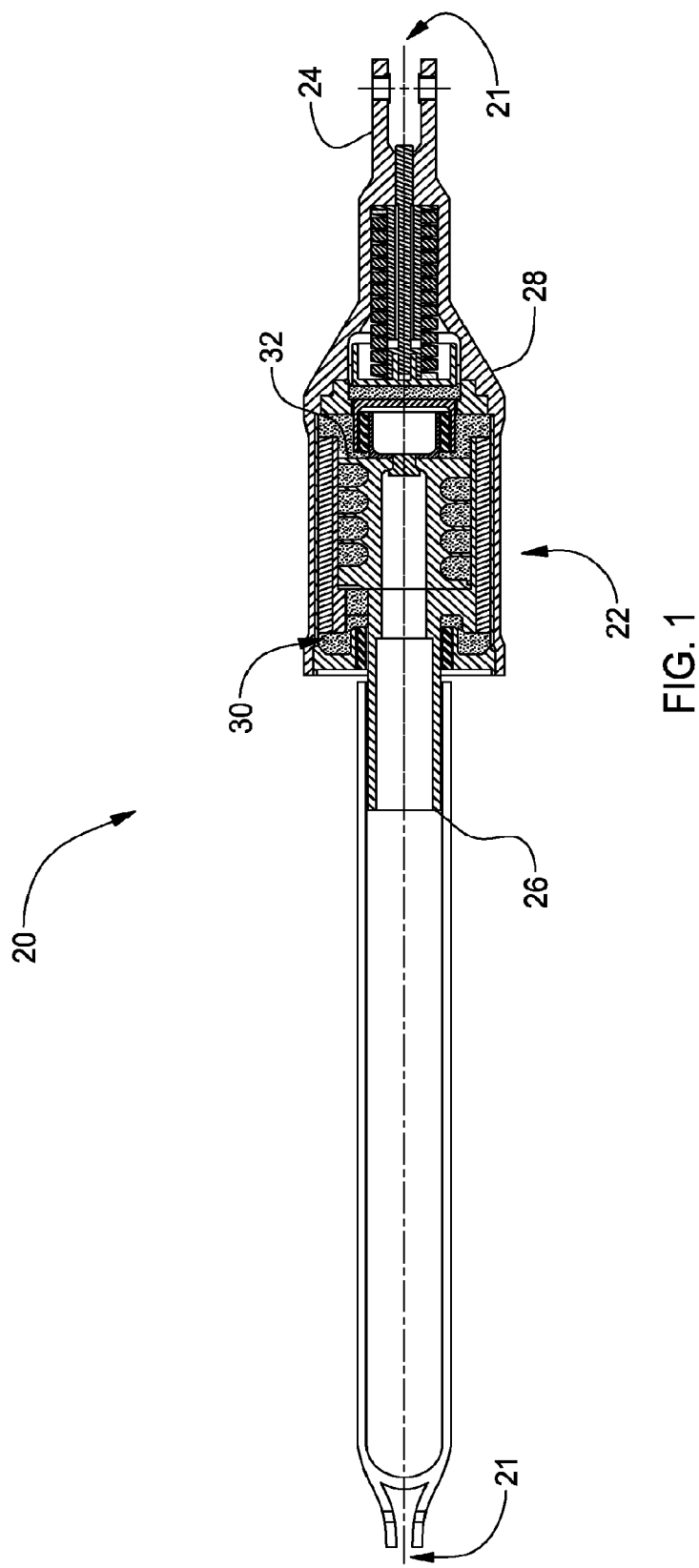
FIG. 1 shows an isolator strut.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

In an embodiment the invention includes a support strut for supporting an axial load. The support strut preferably includes a strut isolator. In an embodiment the strut isolator has a first strut end member and a second strut end member, the second strut end distal from the first strut end. Preferably the first strut end member includes an outer rigid housing, the outer rigid housing defining an inner cavity. Preferably the second strut end member includes an inner rigid member, the inner rigid member extending into the outer rigid housing inner cavity with the inner rigid member including an inertial track extending in a direction from the first strut end towards the second strut end, the inertial track having a first entrance end proximate the first strut end and a second entrance end proximate the second strut end. Preferably the isolator includes a first outer tubular elastomer disposed between the outer rigid housing and the inner rigid member, the first outer tubular elastomer bonded to a first inner rigid surface of the outer rigid housing, the first outer tubular elastomer bonded to a first outer rigid surface of the inner rigid member, the first outer tubular elastomer having an inner diameter ID. Preferably the isolator includes a second inner end tubular elastomer, the second inner end tubular elastomer disposed between the outer rigid housing and the inner rigid member proximate the second strut end, the second inner end tubular elastomer bonded to a second inner rigid surface of the outer rigid housing, the second inner tubular elastomer bonded to a second outer rigid surface of the inner rigid member, the second inner end tubular elastomer having an second outer diameter OD2. Preferably the isolator includes a third inner end tubular elastomer, the third inner end tubular elastomer disposed between the outer rigid housing and the inner rigid member proximate the first strut end, the third inner end tubular elastomer bonded to a third inner rigid surface of the outer rigid housing, the third inner tubular elastomer bonded to a third outer rigid surface of the inner rigid member, the third inner end tubular elastomer having a third outer diameter OD3. Preferably the isolator includes an isolator fluid, with the second outer diameter OD2 and the third outer diameter OD3 less than the inner diameter ID, wherein the second inner end tubular elastomer, the first outer tubular elastomer, the outer rigid housing, and the inner rigid member provide a first variable volume fluid chamber proximate the second strut end and the second track entrance end, the third inner end tubular elastomer, the first outer tubular elastomer, the outer rigid housing, and the inner rigid member provide a second variable volume fluid chamber proximate the first strut end and the first track entrance end. Preferably a movement of the first strut end member in a first strut direction towards the second strut end member plungers the fluid from the second variable volume chamber through the track towards the first variable volume chamber, and an opposite movement of the first strut end member in a second direction away from the second strut end plungers the fluid from the first variable volume chamber through the track towards the second variable volume chamber.

Figure 2:
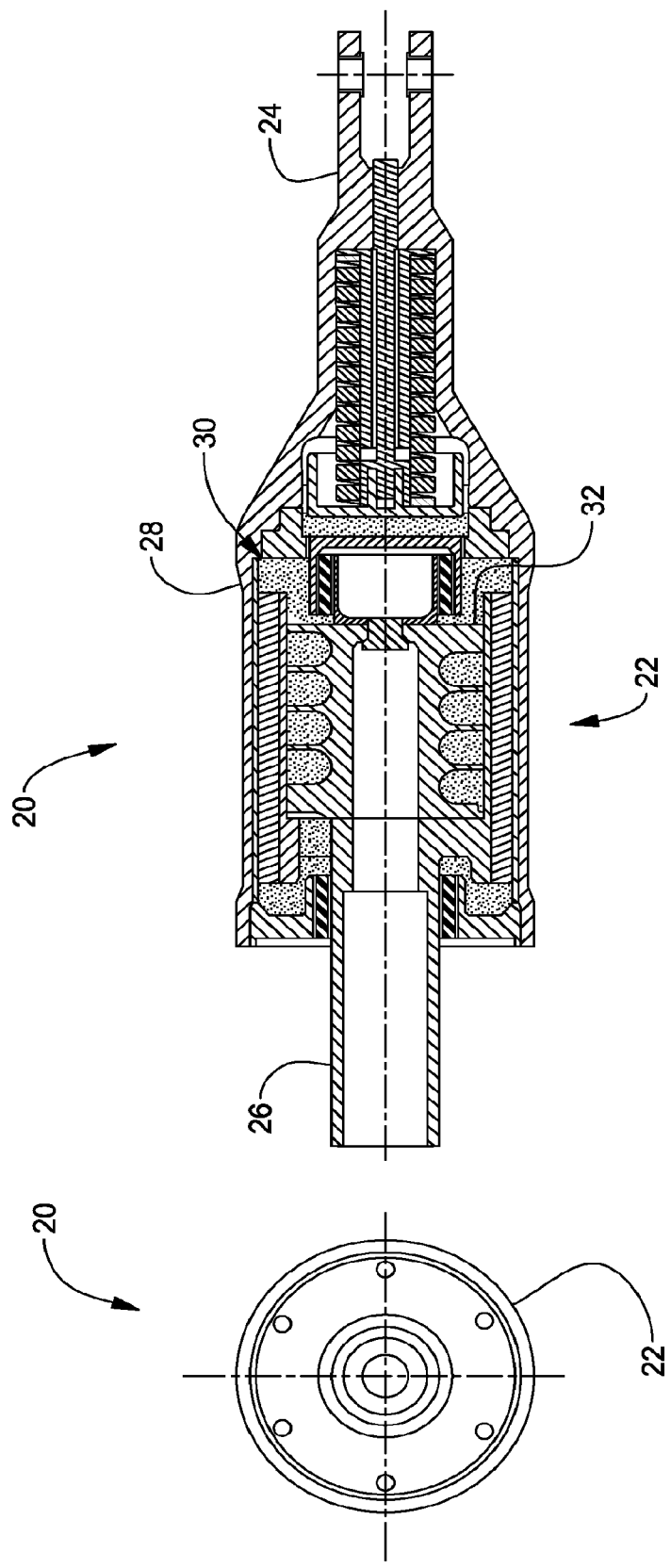
FIG. 2 shows views of a strut isolator.
Figure 3:
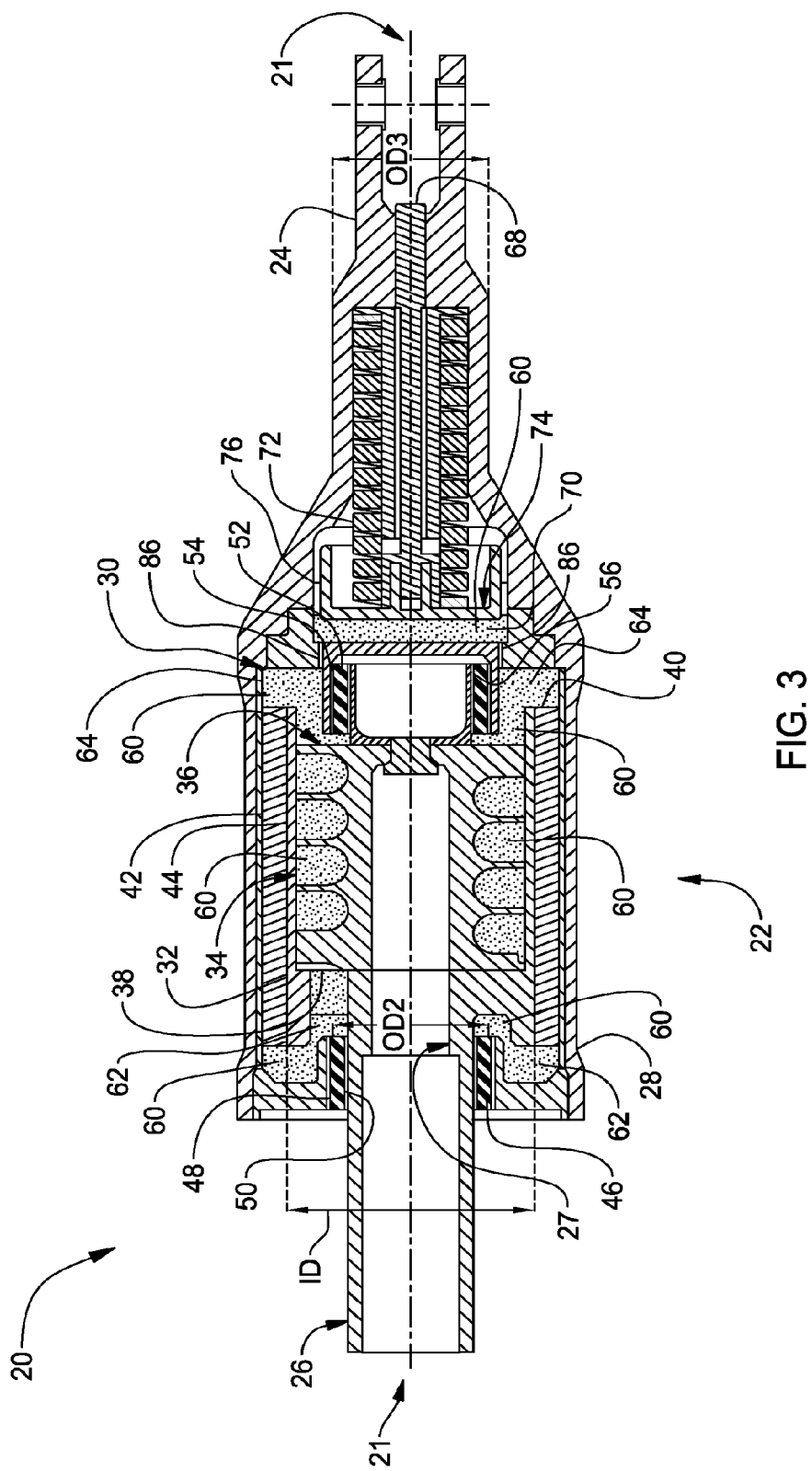
FIGS. 3, 3A, 3B show strut isolator views.

In an embodiment the invention includes an isolated support strut for supporting an axial load. FIG. 1 shows an axial support strut 20 for supporting an axial load. The support strut 20 includes a strut isolator 22. As shown in FIGS. 1-3 the strut isolator 22 has a first strut end member 24 and a second strut end member 26, with the second strut end 26 distal from the first strut end 24. The first strut end member 24 includes an outer rigid nonelastomer housing 28, with the outer rigid housing 28 defining an inner cavity 30. The second strut end member 26 includes an inner rigid nonelastomer member 32, the inner rigid member 32 extending into and inside the outer rigid housing inner cavity 30. The second strut end member extends into the cavity 30 through a first variable volume fluid chamber 62, by going through the inside inner diameter of a second inner end tubular elastomer 46, preferably with a solid member rigid structural extension 27 longitudinally extending through the tubular elastomer inner core bore. The inner rigid member 32 includes an inertial track 34 extending in a direction from the first strut end 24 towards the second strut end 26, the inertial track 34 having a first entrance end 36 proximate the first strut end 24 and a second entrance end 38 proximate the second strut end 26. Preferably the inertial track 34 is a circuitous circular nondirect non-line-of-sight helical path wrapped fluid conduit track.

As shown in FIGS. 1-3 the strut isolator 22 includes a first outer tubular spring elastomer 40 disposed between the outer rigid housing 28 and the inner rigid member 32, the first outer tubular spring elastomer 40 bonded to a first inner rigid surface 42 of the outer rigid housing 28, the first outer tubular spring elastomer 40 bonded to a first outer rigid surface 44 of the inner rigid member 32, and the first outer tubular spring elastomer 40 having an inner diameter ID. Preferably the first outer tubular spring elastomer 40 is comprised of a longitudinal cylindrical shell, preferably with a longitudinal length greater than the diameter of the first outer tubular spring elastomer. In a preferred embodiment the first outer tubular spring elastomer 40 is bonded to the inner rigid surface 42 of a housing cylindrical shell tubular rigid insert such as shown in FIG. 7 to provide a bonded assembly which is received in and fixed with the rigid housing 28 to provide first outer tubular spring elastomer 40 bonded to outer rigid housing first tubular inner rigid cylindrical surface 42 such as shown in FIGS. 1-3.

As shown in FIGS. 1-6 the strut isolator 22 preferably includes a second inner end tubular elastomer 46, the second inner end tubular elastomer 46 disposed between the outer rigid housing 28 and the inner rigid member 32 proximate the second strut end 26, the second inner end tubular elastomer 46 bonded to a second inner rigid surface 48 of the outer rigid housing 28, the second inner tubular elastomer 46 bonded to a second outer rigid surface 50 of the inner rigid member 32, and the second inner end tubular elastomer 46 having a second outer diameter OD2. Preferably the second inner end tubular elastomer 46 is comprised of a cylindrical shell, preferably with a longitudinal length less than its diameter.

Figure 4:
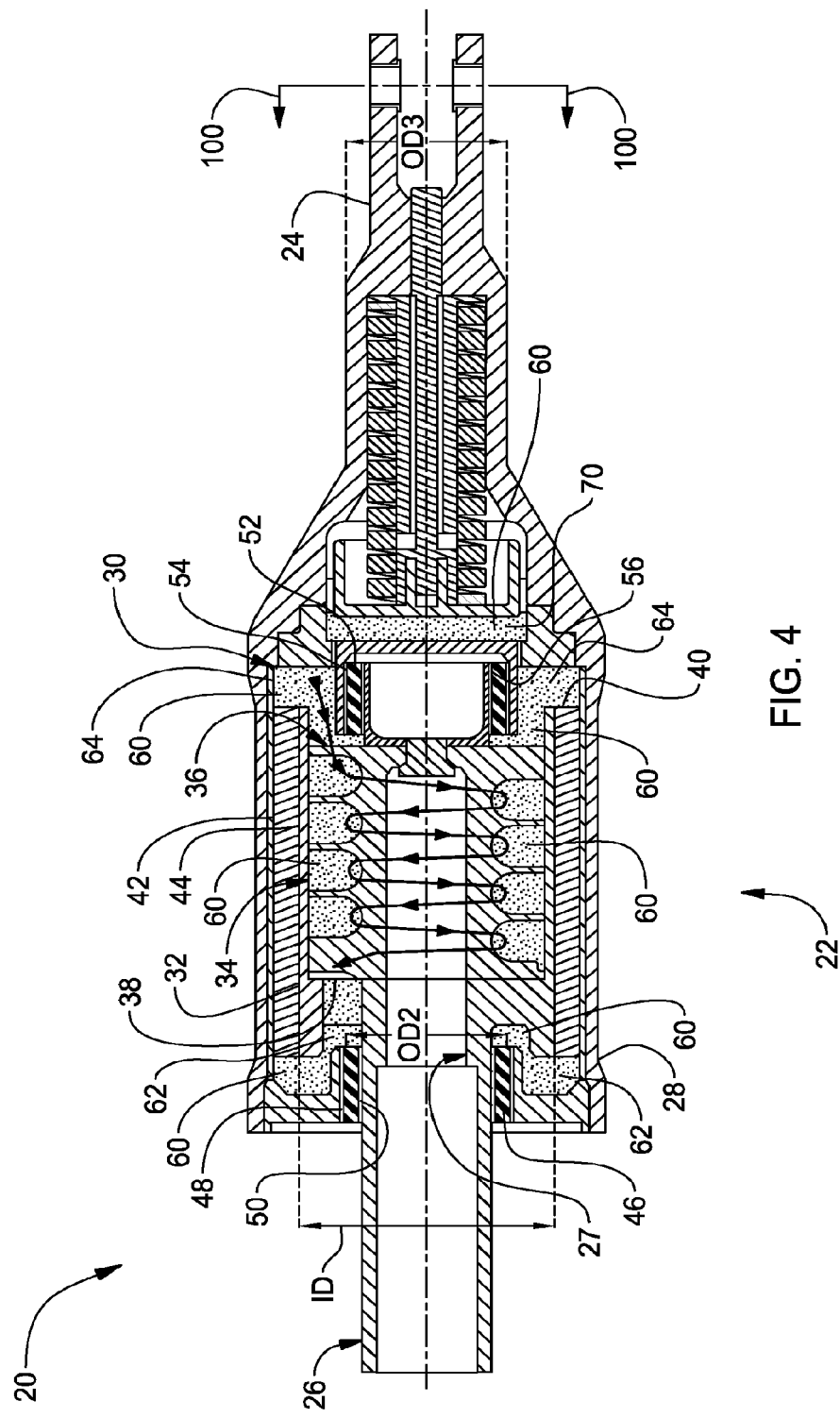
FIG. 4 illustrates the plungering of fluid in a strut isolator with a first strut movement.
Figure 5:
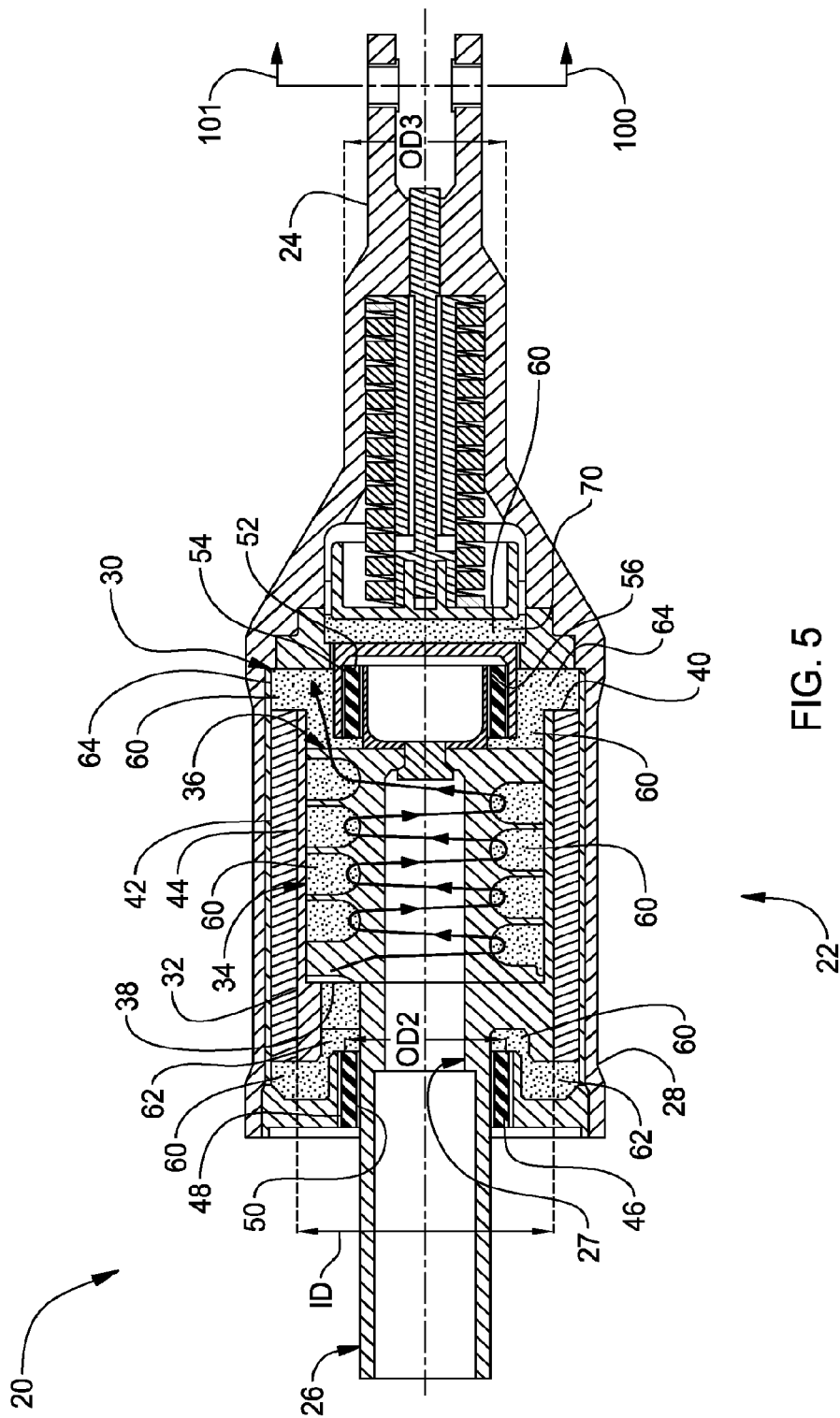
FIG. 5 illustrates the plungering of fluid in the strut isolator with a second opposite strut movement.
Figure 6:
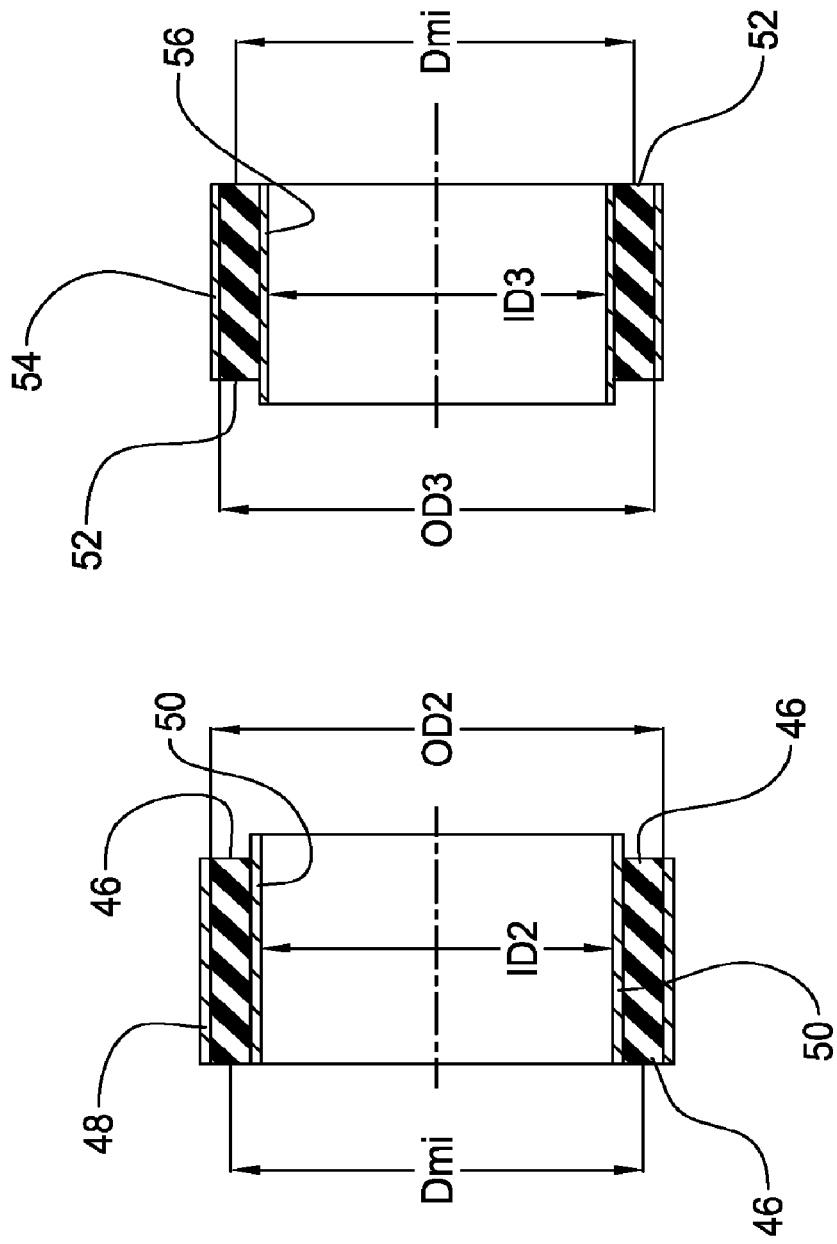
FIG. 6 shows isolator component assemblies.

As shown in FIGS. 1-6 the strut isolator 22 preferably includes a third inner end tubular elastomer 52, the third inner end tubular elastomer 52 disposed between the outer rigid housing 28 and the inner rigid member 32 proximate the first strut end 24, the third inner end tubular elastomer 52 bonded to a third inner rigid surface 54 of the outer rigid housing 28, the third inner tubular elastomer 52 bonded to a third outer rigid surface 56 of the inner rigid member 32, with the third inner end tubular elastomer 52 having a third outer diameter OD3. Preferably the third inner end tubular elastomer 52 is comprised of a cylindrical shell, preferably with a longitudinal length less than its diameter. In preferred embodiments the inner end tubular elastomers 46 and 52 are bonded to the inner rigid surfaces of housing cylindrical shell tubular rigid inserts such as shown in FIG. 6 which are received in and fixed with the rigid housing 28 to provide the inner end tubular elastomers 46 and 52 bonded to outer rigid housing insert cylindrical surfaces 48 and 54 such as shown in FIGS. 1-3. In preferred embodiments the inner end tubular elastomers 46 and 52 are bonded to the outer rigid surfaces of inner rigid member cylindrical rigid inserts such as shown in FIG. 6 to provide bonded assemblies which are received by and fixed with the second strut end inner rigid member 32 to provide the inner end tubular elastomers 46 and 52 bonded to the inner rigid member outer rigid insert cylindrical surfaces 50 and 56 such as shown in FIGS. 1-3.

As shown in FIGS. 1-6, the strut isolator 22 preferably includes an isolator fluid 60, preferably an inertial tuning nonsolid mass liquid. Preferably isolator fluid 60 is a low viscosity isolator fluid having a viscosity ≦6 centistokes, preferably ≦5 centistokes. Preferably isolator fluid 60 has a viscosity of about 5 centistokes (5±1).

Preferably the second outer diameter OD2 and the third outer diameter OD3 are less than the inner diameter ID, wherein the second inner end tubular elastomer 46, the first outer tubular spring elastomer 40, the outer rigid housing 28, and the inner rigid member 32 provide a first variable volume fluid pumping chamber 62 proximate the second strut end 26 and the second track entrance end 38.

Preferably the third inner end tubular elastomer 52, the first outer tubular spring elastomer 40, the outer rigid housing 28, and the inner rigid member 32 provide a second variable volume fluid pumping chamber 64 proximate the first strut end 24 and the first track entrance end 36.

As shown in FIGS. 3-5 the movement of the first strut end member 24 in a first strut direction 100 towards the second strut end member 26 plungers the fluid 60 from the second variable volume chamber 64 through the track 34 towards the first variable volume chamber 62, and an opposite movement of the first strut end member 24 in a second direction 101 away from the second strut end 26 plungers the fluid 60 from the first variable volume chamber 62 through the track 34 towards the second variable volume chamber 64. Preferably the second strut end member 26 includes a rigid structural extension 27 extending from outside the exterior of the isolator housing 28, into the inner cavity through the second inner end tubular elastomer 46 and through the first variable volume chamber 62. The isolator is double acting with the isolator strut having a frequency notch band. The isolator provides structural attachments at each end of isolator with a direct load path through the isolator structural members to support the axial loads, preferably with the isolator providing a static spring stiffness of at least 3,000 lbs/inch (static spring stiffness). More preferably the isolator has a static spring stiffness of at least 13,000 lbs/inch, more preferably at least 23,000 lbs/inch, more preferably at least 35,500 lbs/inch. Most preferably the isolator has a static spring stiffness of at least 45,000 lbs/inch. The first outer tubular elastomer spring 40 preferably provides said high static spring stiffness, and carries the static load between the two ends 24, 26, preferably with the elastomer bonded to rigid substrate spring 40 providing a direct load path for the axial load. With such high static stiffness the isolator preferably minimizes the relative motion between its two ends 24, 26. Preferably the isolator provides a tuned frequency notch band, preferably a tuned frequency notch band in the range from about 10 Hz to 40 Hz. In an alternative preferred embodiment a tuned frequency notch band in the range from about 50 Hz to 500 Hz. Preferably the isolator provides a frequency notch band centered about a center frequency, and having a notch band width of at least 10% of the center frequency. In a preferred embodiment the notch band is centered about 30 Hz with a notch band width of about 3 Hz. Preferably the isolator provides a frequency notch band having a notch band depth providing at least a 50% reduction of the static spring stiffness, preferably at least 50% of the at least 3,000 lbs/inch static spring stiffness, preferably at least 50% of the 13,000 lbs/inch static spring stiffness, preferably at least 50% of the 23,000 lbs/inch static spring stiffness, preferably at least 50% of the 35,500 lbs/inch static spring stiffness, and preferably at least 50% of the 45,000 lbs/inch static spring stiffness.

Preferably the isolator strut includes a variable volume compensator nonpumping fluid chamber 70. Preferably the variable volume compensator nonpumping fluid chamber 70 includes a spring 72. In an embodiment the spring 72 is comprised of a gas spring. In an embodiment the spring 72 is comprised of elastomer spring. In an embodiment the spring 72 is comprised of a coil spring. Preferably the variable volume compensator nonpumping fluid chamber 70 includes a spring loaded compensator piston 74, and a compensator diaphragm 76. The variable volume compensator nonpumping fluid chamber 70 allows for thermal expansion and contraction of the fluid due to temperature changes while minimizing the pressure charge in the isolator, preferably with a pressure change less than 15%. Preferably the variable volume compensator is nonpumping and dynamically isolated from the pumping chambers 62 and 64 and the track 34. Preferably the isolator strut includes a variable volume fluid thermal expansion nonpumping compensator chamber 70 proximate the second variable volume chamber, preferably with a spring 72 that allows for thermal expansion and contraction of the fluid due to temperature changes while minimizing the pressure change in the isolator, preferably with a pressure change less than 15%, with the compensator chamber 70 comprising a nonpumping-dynamically isolated fluid chamber. Preferably the isolator strut includes a variable volume fluid thermal expansion nonpumping compensator chamber 70 with a pressure indicator 68.

Figure 3B:
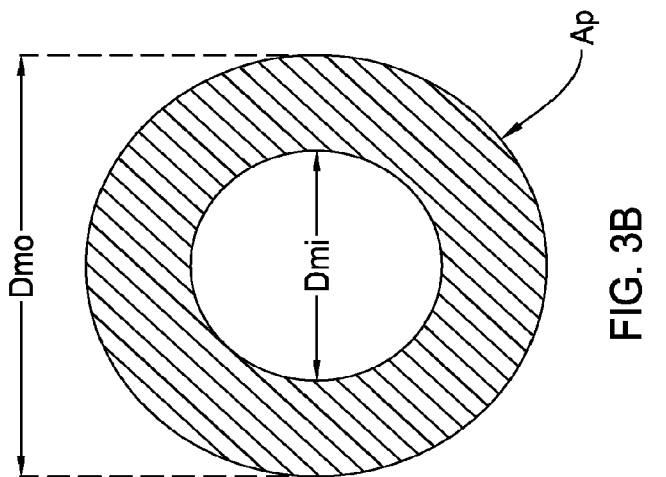
Figure 3A:
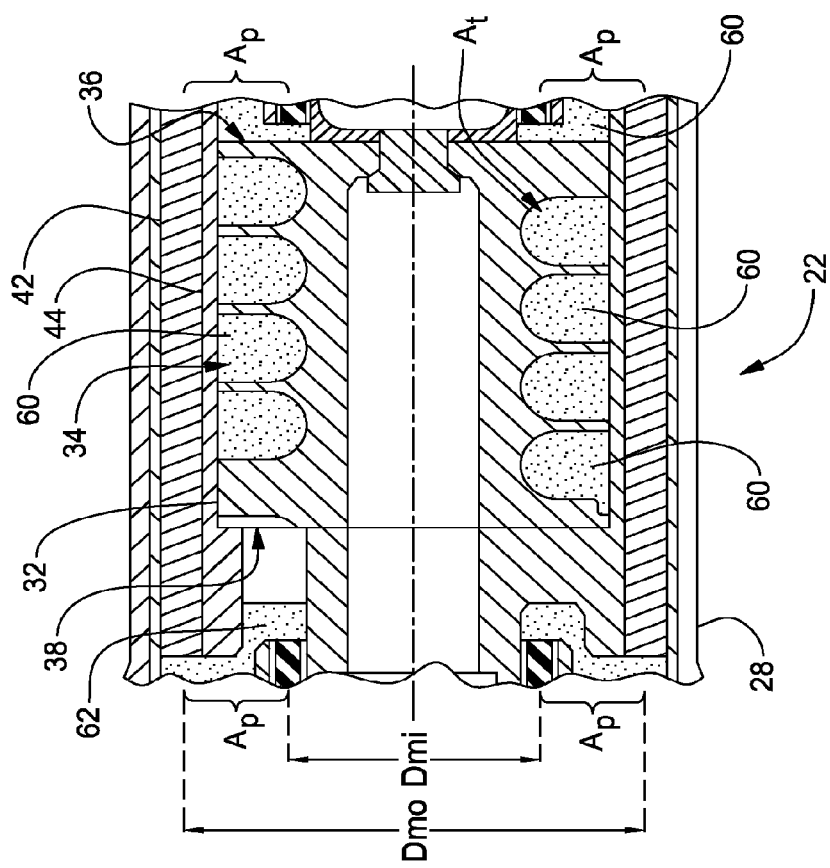
Figure 8:
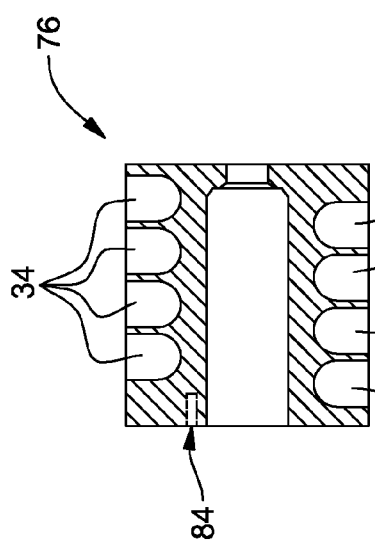
FIGS. 8, 8A, 8B show isolator component track core modular inserts.
Figure 8A:
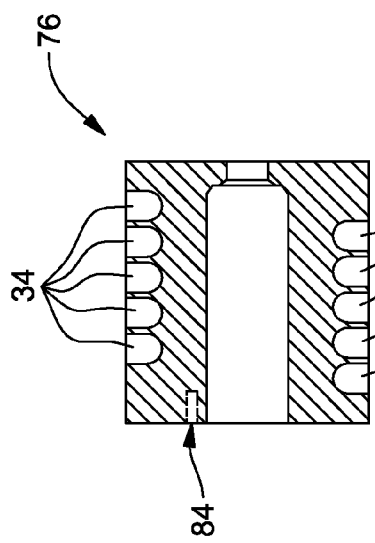
Figure 8B:
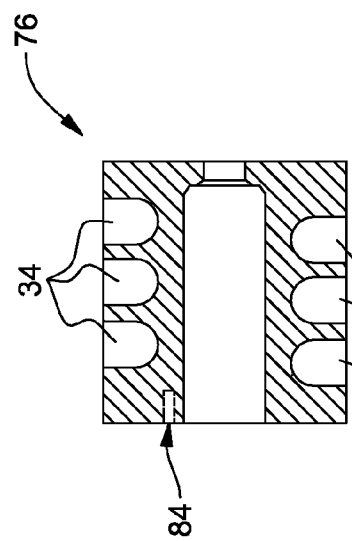
Figure 11:
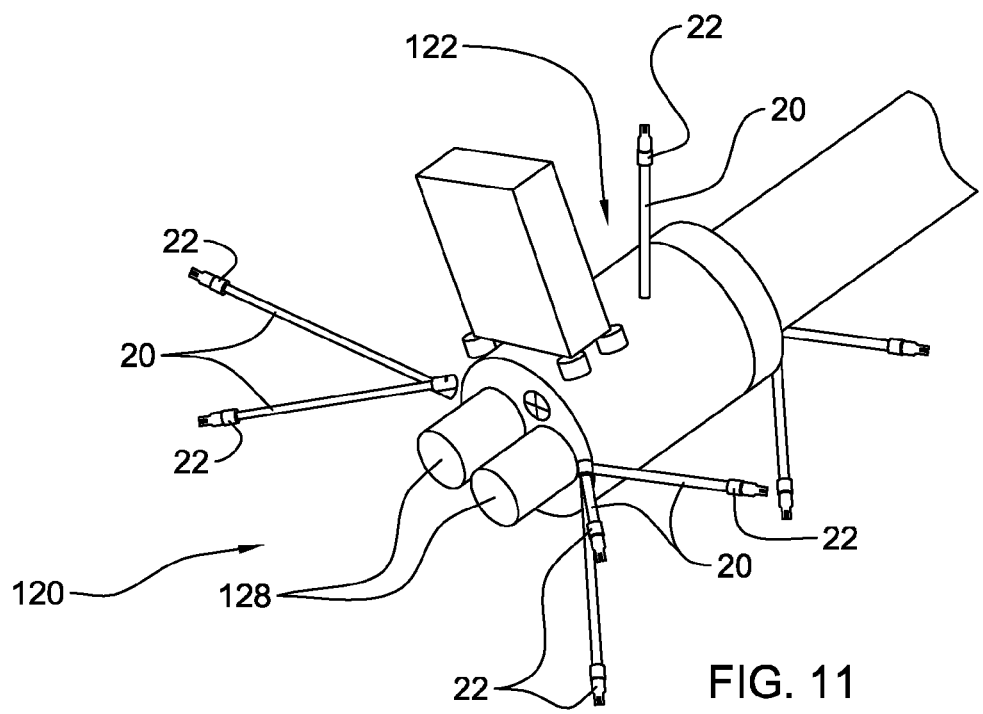
FIG. 11 shows a view of an aircraft suspension system for isolating an aircraft power unit.
Figure 12:
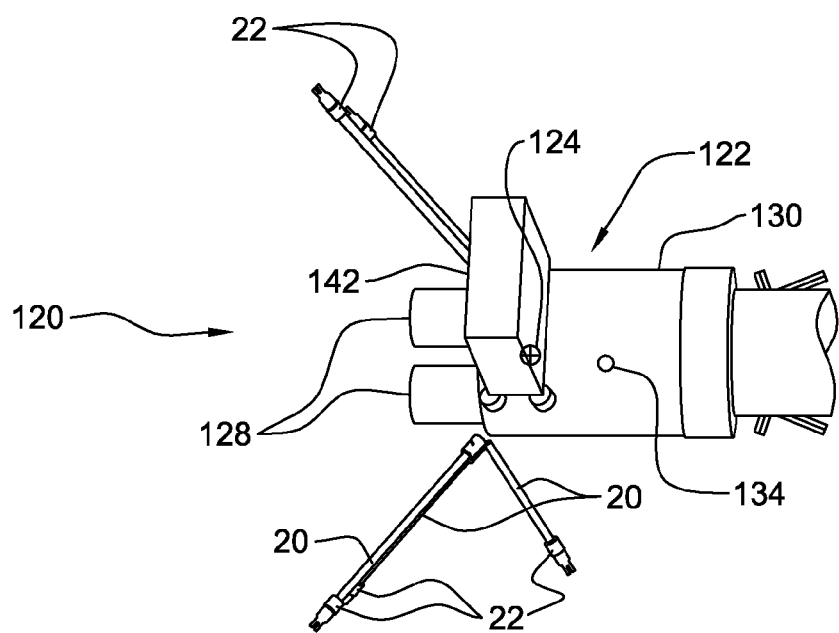
FIG. 12 shows a view of an aircraft suspension system for isolating an aircraft power unit.
Figure 13:
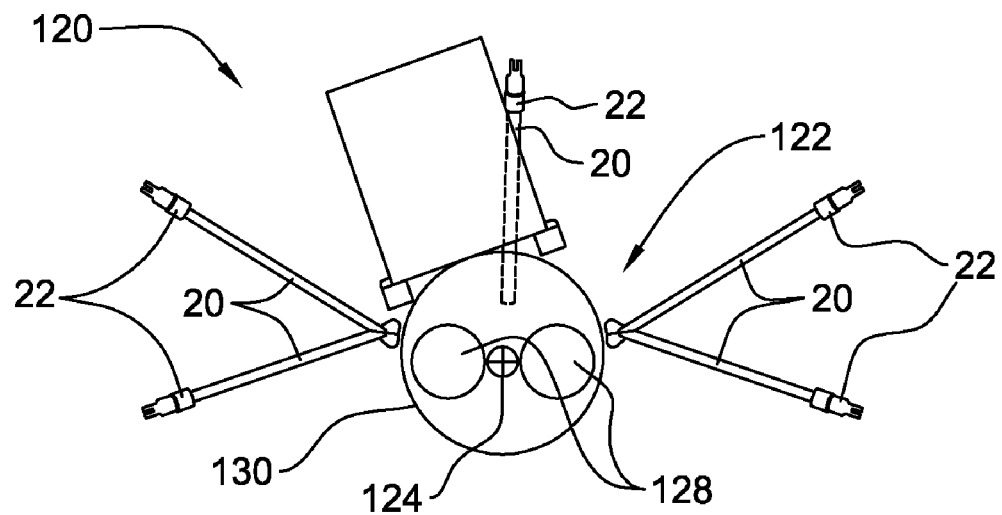
FIG. 13 shows a view of an aircraft suspension system for isolating an aircraft power unit.
Figure 14:
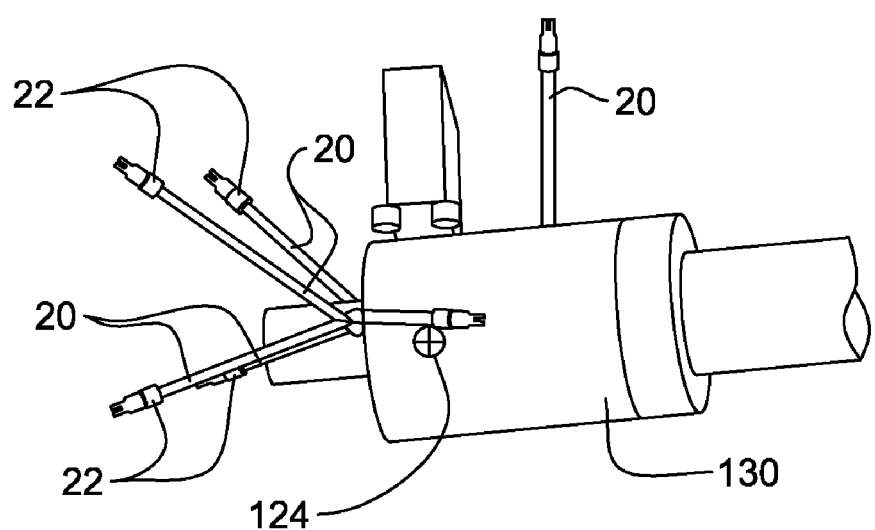
FIG. 14 shows a view of an aircraft suspension system for isolating an aircraft power unit.

As shown in FIGS. 3A-B, the isolator 22 preferably has a plunger pumping area (Ap) greater than the cross-sectional area (At) of the track 34. The plunger pumping area (Ap) is preferably the surface area in the variable volume chamber that is plungering and pumping the fluid, preferably as shown in FIGS. 3A-B the plunger pumping area (Ap) is preferably the annular O doughnut area from the middle diameter circumference of the first outer tubular elastomer 40 to the middle diameter circumference of the inner end tubular elastomer (third elastomer 52 or second elastomer 46), preferably with the middle diameter circumference of the inner end tubular elastomer (third elastomer 52 and second elastomer 46) substantially equal with the second variable volume chamber 64 plunger pumping area (Ap) and the first variable volume chamber 62 plunger pumping area (Ap) substantially equal. Preferably Ap/At ≧5, more preferably Ap/At ≧8, Ap/At ≧10. As shown in FIG. 3A-B, Ap is equal to Ap'−Ap", with Ap' being the area of the circle with the middle diameter (Dmo) of the first outer tubular elastomer 40 (Ap'=(π/4) Dmo), and Ap" being the area of the circle with the middle diameter (Dmi) of the middle diameter circumference of the inner end tubular elastomer (third elastomer 52 and second elastomer 46) (Ap"=(π/4)Dmi). Preferably making the isolator 22 includes bonding the first outer tubular spring elastomer 40 to the inner rigid surface 42 of a housing cylindrical shell tubular rigid insert to provide a preswaged bonded assembly preform with the first outer tubular spring elastomer 40 bonded to outer rigid housing first tubular inner rigid cylindrical surface 42 with a nonreduced preswaged outer rigid member diameter. Preferably making the isolator 22 includes providing the first outer tubular spring elastomer 40 with the elastomer bonded to and between the housing inner rigid surface 42 and the inner rigid member outer rigid surface 44, preferably with the preswaged bonded assembly swaged to reduce the outer rigid member diameter and compress the elastomer prior to installing in the isolator 22. Preferably making the isolator includes bonding the inner end tubular elastomers 46 and 52 to the inner rigid surfaces of housing cylindrical shell tubular rigid inserts, along with the inner end tubular elastomers 46 and 52 also preferably bonded to the outer rigid surfaces of inner rigid member cylindrical rigid inserts to provide the preswaged bonded inner end assemblies. The preswaged bonded inner end assemblies with the inner end tubular elastomers 46 and 52 in between and bonded to outer rigid housing insert cylindrical surfaces 48 and 54 and the inner rigid member cylindrical rigid inserts outer rigid surfaces 50 and 56 are preferably then also swaged to reduced diameters before being assembled into the isolator between the rigid housing 28 and the inner member 32. Preferably making the isolator includes providing the second inner end tubular elastomer 46, with the tubular elastomer 46 disposed between the outer rigid housing 28 and the inner rigid member 32 proximate the second strut end 26, the second inner end tubular elastomer 46 bonded to a second inner rigid surface 48 of the outer rigid housing 28, the second inner tubular elastomer 46 bonded to a second outer rigid surface 50 of the inner rigid member 32, and the second inner end tubular elastomer 46 having an second outer diameter OD2, with preferably with the elastomer bonded to inner and outer rigid member preswaged assembly swaged to reduce the outer rigid member surface diameter and compress the elastomer prior to installing in the isolator 22. Preferably making the isolator includes providing the third inner end tubular elastomer, with the tubular elastomer disposed between the outer rigid housing and the inner rigid member proximate the first strut end, the third inner end tubular elastomer bonded to a third inner rigid surface of the outer rigid housing, the third inner tubular elastomer bonded to a third outer rigid surface of the inner rigid member, and the third inner end tubular elastomer having an third outer diameter OD3, with preferably with the elastomer bonded to inner and outer rigid member preswaged assembly swaged to reduce the outer rigid member surface diameter and compress the elastomer prior to installing in the isolator 22. Preferably making the isolator includes providing an inner rigid member inertial liquid track 34, preferably having the cross-sectional area (At). As shown in FIGS. 7-10, providing inner rigid member inertial liquid track 34 preferably includes providing a helical track core modular insert 76 that is received by a track core receiver 78 of the inner rigid member 32. Preferably the helical track core modular insert 76 is rotatably positionable within the track core receiver 78 for fine tuning of the track path to provide fine tuning of the frequency isolation notch band and the center notch frequency. Preferably gross tuning is provided by selecting a preferred helical track core modular insert 76 from a plurality of inserts and then with fine tuning by selecting the orientation of the selected insert 76 in the receiver 78. Preferably the invention provides for rotating of the relative rotational orientation of the helical track core modular insert 76 relative to the track core receiver 78 and its fluid flow mouth 80 to fine tune the isolator. As shown in FIGS. 7-10, the helical track core modular insert 76 includes a plurality of track core tuning adjustment holes 84, to provide a plurality of rotational positions of the insert 76 relative to the track core receiver 78 and its fluid flow mouth 80. Preferably the inner rigid member 32 and its track core receiver 78 includes an orientation fixture 82, such as a track core fixturing pin protrusion 82 that is received by one of the plurality of four track core tuning adjustment holes 84. Additionally the invention provides further relative gross tunability with helical track core modular inserts 76 with different inertial track paths 34 such as shown by FIGS. 8-8B, that are receivable in the track core receiver 78. As shown in FIGS. 10 and 7, the helical track core modular inserts 76 are rotatable relative to the track core receiver mouth 80, such that the overlay of the mouth 80 and the inertial track entrance 38 provides fine adjustment of the inertial path track between the two variable volume pumping chambers 62 and 64. Preferably the isolator 22 is provided with a variable volume compensator chamber 70 with a compensator spring 72, with the compensator chamber in fluid communication with the pumping chambers through a relatively small cross sectional area liquid conduit 86, with its cross section area relatively small compared with the inertial track cross section (At).

In an embodiment the invention includes an isolator. The isolator preferably includes a first end member and a second end member, the second end distal from the first end. The first end member includes an outer rigid housing, the outer rigid housing defining an inner cavity. The second end member includes an inner rigid member, the inner rigid member extending into the outer rigid housing inner cavity, the inner rigid member including an inertial fluid track extending in a direction from the first end towards the second end, the inertial fluid track having a first entrance end proximate the first end and a second entrance end proximate the second end. The isolator preferably includes a first outer tubular elastomer disposed between the outer rigid housing and the inner rigid member. The isolator preferably includes a second inner end tubular elastomer, the second inner end tubular elastomer disposed between the outer rigid housing and the inner rigid member proximate the second end. The isolator preferably includes an isolator fluid with the second inner end tubular elastomer, the first outer tubular elastomer, the outer rigid housing, and the inner rigid member providing a first variable volume fluid chamber proximate the second end and the second track entrance end, the outer rigid housing and the inner rigid member defining a distal second variable volume fluid chamber proximate the first end and the first track entrance end, wherein a movement of the first end member in a first direction towards the second end member plungers the fluid from the second variable volume chamber through the track towards the first variable volume chamber, and an opposite movement of the first end member in a second direction away from the second end plungers the fluid from the first variable volume chamber through the track towards the second variable volume chamber.

In an embodiment the strut isolator 22 includes the first strut end member 24 and the second strut end member 26, the second strut end 26 distal from the first strut end 24. The first strut end member 24 includes outer rigid nonelastomer housing 28, the outer rigid housing 28 defining inner cavity 30. The second strut end member 26 includes inner rigid nonelastomer member 32, the inner rigid member 32 extending into and inside the outer rigid housing inner cavity 30. The second strut end member 26 extends into the cavity 30 through first variable volume fluid chamber 62, by going through the inside inner diameter of the second inner end tubular elastomer 46, with solid rigid structural extension member 27 longitudinally extending through the tubular elastomer inner core bore. The inner rigid member 32 includes inertial fluid track 34 extending in the direction from the first strut end 24 towards the second strut end 26, the inertial fluid track 34 having a first entrance end 36 proximate the first strut end and a second entrance end 38 proximate the second strut end. Preferably the inertial fluid track 34 is a circuitous circular nondirect helical wrapped fluid conduit track.

The strut isolator 22 includes first outer tubular spring elastomer 40 disposed between the outer rigid housing 28 and the inner rigid member 32. Preferably the first outer tubular elastomer 40 is comprised of a longitudinal cylindrical shell, preferably with a longitudinal length greater than its diameter. The first outer tubular spring elastomer 40 is bonded to a first inner rigid surface 42 of the outer rigid housing 28, the first outer tubular spring elastomer 40 bonded to first outer rigid surface 44 of the inner rigid member 32, with the first outer tubular spring elastomer 40 having inner diameter ID, outer diameter OD and middle diameter (Dmo).

The strut isolator 22 includes second inner end tubular elastomer 46, the second inner end tubular elastomer 46 disposed between the outer rigid housing 28 and the inner rigid member 32 proximate the second strut end 26. Preferably the second inner end tubular elastomer 46 is comprised of a longitudinal cylindrical shell, preferably with a longitudinal length less than its diameter. The second inner end tubular elastomer 46 is bonded to second inner rigid surface 48 of the outer rigid housing 28, the second inner tubular elastomer 46 bonded to second outer rigid surface 50 of the inner rigid member 32, with the second inner end tubular elastomer 46 having a second outer diameter OD2, second inside diameter ID2, and middle diameter (Dmi) of the inner end tubular elastomer.

The strut isolator 22 includes third inner end tubular elastomer 52, the third inner end tubular elastomer 52 disposed between the outer rigid housing 28 and the inner rigid member 32 proximate the first strut end 24, the third inner end tubular elastomer 52 bonded to third inner rigid surface 54 of the outer rigid housing 28, the third inner tubular elastomer 52 bonded to third outer rigid surface 56 of the inner rigid member 32, with the third inner end tubular elastomer 52 having a third outer diameter OD3, third inside diameter ID3, and middle diameter (Dmi). Preferably the third inner end tubular elastomer 52 is a longitudinal cylindrical shell, preferably with a longitudinal length less than its diameter.

The strut isolator 22 includes isolator fluid 60 comprised of an inertial tuning nonsolid mass liquid.

Preferably the second outer diameter OD2 and the third outer diameter OD3 are less than the inner diameter ID, and the inner end tubular elastomer middle diameter (Dmi) is less than the first outer tubular elastomer middle diameter (Dmo), with the second inner end tubular elastomer 46, the first outer tubular spring elastomer 40, the outer rigid housing 28, and the inner rigid member 32 providing a first variable volume fluid pumping chamber 62 proximate the second strut end 26 and the second track entrance end 38, preferably with the first variable volume fluid pumping chamber 62 having plunger pumping area (Ap). Preferably the third inner end tubular elastomer 52 with the inner end tubular elastomer middle diameter (Dmi), the first outer tubular spring elastomer 40 with the first outer tubular elastomer middle diameter (Dmo), the outer rigid housing 28, and the inner rigid member 32 define distal second variable volume fluid pumping chamber 64 distal and on the opposite end from the first fluid pumping chamber 62, preferably with the second variable volume fluid pumping chamber 64 having plunger pumping area (Ap). Preferably the distal second variable volume fluid pumping chamber 64 is proximate the first strut end 24 and the first track entrance end 36, wherein a movement of the first strut end member 24 in a first strut direction towards the second strut end member plungers and pumps the fluid from the second variable volume chamber with the plunger pumping area (Ap) through the track 34 towards the first variable volume chamber, and an opposite movement of the first strut end member in a second direction away from the second strut end plungers and pumps the fluid with the plunger pumping area (Ap) from the first variable volume chamber through the track 34 towards the second variable volume chamber, preferably with the track 34 having the track cross-sectional area (At).

Preferably the second strut end member 26 includes rigid structural extension 27 extending from outside the exterior of the isolator and housing 28, into the inner cavity 30 through the second inner end tubular elastomer 46 and through the first variable volume chamber 62, to provide a double acting isolator strut 20 having a frequency notch band, that provides structural attachments at each end of the isolator 22 with a direct load path through the isolator structural members to support the axial loads, preferably through the outer tubular elastomer spring 40. Preferably isolator 22 provides the structural support stiffness of at least 3,000 lbs/inch static spring stiffness, more preferably the at least 13,000 lbs/inch spring stiffness, more preferably the at least 23,000 lbs/inch spring stiffness, more preferably the at least 35,500 lbs/inch spring stiffness, most preferably the at least 45,000 lbs/inch spring stiffness, with this high static stiffness of the isolator 22 provides for structural support while minimizing the relative motion between its two ends. Preferably the strut isolator 22 provides a frequency notch band, preferably a frequency notch band in the range from about 10 Hz to 40 Hz. In a preferred alternative embodiment the strut isolator 22 provides a frequency notch band in the range from about 50 Hz to 500 Hz. Preferably the strut isolator 22 provides a frequency notch band centered about a center frequency, and having a notch band width of at least 10% of the center frequency. In a preferred embodiment the strut isolator 22 has a frequency notch band centered about 30 Hz with a notch band width of about 3 Hz. Preferably the strut isolator has a notch band depth providing at least a 50% reduction of the static spring stiffness, preferably a stiffness reduction of at least 50% of the at least 3,000 lbs/inch static spring stiffness, preferably a stiffness reduction of at least 50% of the at least 13,000 lbs/inch static spring stiffness, preferably a stiffness reduction of at least 50% of the at least 23,000 lbs/inch static spring stiffness, preferably a stiffness reduction of at least 50% of the at least 35,500 lbs/inch static spring stiffness, and preferably a stiffness reduction of at least 50% of the at least 45,000 lbs/inch static spring stiffness.

Preferably the strut isolator 22 includes variable volume compensator chamber 70. Preferably the variable volume compensator chamber 70 includes compensator spring 72, spring loaded compensator piston 74, and compensator diaphragm 76. In an embodiment the compensator spring is a gas spring. In an embodiment the compensator spring is an elastomer spring. In an embodiment the compensator spring is a coil spring. Preferably the spring loaded compensator piston 74 and the compensator diaphragm 76 allow for thermal expansion and contraction of the fluid due to temperature changes while minimizing the pressure change in the isolator, preferably with pressure changes less than 15%, preferably the variable volume compensator nonpumping and dynamically isolated from the pumping chambers 62, 64 and the track 34. Preferably the volume compensator chamber 70 is proximate the second variable volume chamber, and in fluid communication with the second variable volume pumping chamber through a relatively small cross-section area conduit 86, compared to the cross-section area (At) of the track conduit 34. Preferably the compensator spring 72, the spring loaded compensator piston 74, the compensator diaphragm 76, and the compensator chamber 70 are dynamically isolated with the volume of the compensator 70 inhibited from changing by the movements 100, 101, but relatively slowly changing over extended period of time due to temperature based volume changes of the liquid 60. Preferably the variable volume compensator chamber includes the spring loaded compensator piston 74.

In an embodiment the invention includes a longitudinal isolator. The longitudinal isolator preferably has an exterior and a longitudinally extending axis. The longitudinal isolator preferably includes a first end member and a second end member, the second end opposite from the first end along the longitudinally extending axis. The first end member preferably includes an outer rigid longitudinally extending housing, the outer rigid longitudinally extending housing extending longitudinally towards the second end member. The outer rigid longitudinally extending housing preferably defines an interior cavity, the interior cavity containing a first variable volume fluid chamber proximate the second end and a distal second variable volume fluid chamber proximate the first end. The second end member preferably includes a rigid structural extension longitudinally extending from the isolator exterior into the interior cavity through the first variable volume chamber, the rigid structural extension including an inner rigid member, the inner rigid member including an inertial fluid track extending in a direction from the first end towards the second end, the inertial fluid track having a first entrance end in fluid communication with the second variable volume chamber and a second entrance end in fluid communication with the first variable volume chamber.

The longitudinal isolator preferably includes an isolator fluid wherein a movement of the first end member in a first longitudinal direction towards the second end member plungers the fluid from the second variable volume chamber through the track towards the first variable volume chamber, and an opposite movement of the first end member in a second longitudinal direction away from the second end plungers the fluid from the first variable volume chamber through the track towards the second variable volume chamber.

In an embodiment the invention includes longitudinal strut isolator 22. The longitudinal strut isolator has an exterior and a longitudinally extending axis 21.

Isolator 22 includes the first strut end member 24 and second strut end member 26, the second strut end 26 opposite and longitudinally distal from the first strut end 24 along its longitudinally extending axis 21. The first strut end member 24 includes the outer rigid nonelastomer longitudinally extending housing 28, the outer rigid longitudinally extending housing 28 extending longitudinally towards the second strut end member 26. The outer rigid longitudinally extending housing 28 defines the interior inner cavity 30, with the interior cavity 30 containing the first variable volume fluid pumping chamber 62 proximate the second strut end and the distal second variable volume fluid pumping chamber 64 distal and opposite end from the first chamber 62 proximate the first strut end. The second strut end member 26 includes the rigid structural extension 27 longitudinally extending from the isolator exterior into the interior inner cavity 30 through the first variable volume chamber 62, preferably by going through the inside inner diameter of the second inner end tubular elastomer 46, with the rigid member longitudinally extending through the tubular elastomer inner core bore. The inner rigid nonelastomer member includes the rigid structural extension. The inner rigid member includes the inertial fluid track 34. Preferably the track is a circuitous circular nondirect helical wrapped liquid conduit track, preferably with the inner rigid the helical track core insert member 76 having the outer perimeter track groove with the cross section area (At), preferably with a smooth curved cross section profile, with the inner core insert member 76 received inside the inner core member receiving housing track core receiver 78. The track 34 extends in the direction from the first strut end towards the second strut end, the inertial fluid track 34 having the first entrance end 36 in fluid communication with the second variable volume chamber proximate the first strut end and the second entrance end 38 in fluid communication with the first variable volume chamber proximate the second strut end.

The first outer longitudinal cylindrical shell tubular elastomer spring 40 preferably has a longitudinal length greater than its diameter. The first outer longitudinal spring elastomer 40 is disposed between the outer rigid housing and the inner rigid member. Preferably the first outer tubular elastomer 40 is bonded to the first inner rigid surface 42 of the outer rigid housing, and bonded to the first outer rigid surface 44 of the inner rigid member. The first outer tubular spring elastomer preferably has the inner diameter ID, the outer diameter OD and the middle diameter (Dmo).

As shown in FIGS. 3-6, the second inner end cylindrical shell tubular elastomer 46 preferably has a longitudinal length less than its diameter. The second inner end tubular elastomer 46 is disposed between the outer rigid housing and the inner rigid member proximate the second strut end. The second inner end tubular elastomer 46 is preferably bonded to the second inner rigid surface 48 of the outer rigid housing, and bonded to the second outer rigid surface 50 of the inner rigid member, preferably with the second inner end tubular elastomer having the second outer diameter OD2, the second inside diameter ID2, and the middle diameter (Dmi). The third inner end cylindrical shell tubular elastomer 52 preferably has the longitudinal length less than its diameter. The third inner end tubular elastomer 52 is preferably disposed between the outer rigid housing and the inner rigid member proximate the first strut end, with the third inner end tubular elastomer 52 bonded to the third inner rigid surface 54 of the outer rigid housing, and bonded to the third outer rigid surface 56 of the inner rigid member. The third inner end tubular elastomer preferably has the third outer diameter OD3, the inside diameter ID3, and the middle diameter (Dmi).

The isolator 22 includes the inertial tuning nonsolid mass liquid isolator fluid 60. Preferably the second and third middle diameter (Dmi) are less than the middle diameter (Dmo), with the second inner end tubular elastomer, the first outer tubular spring elastomer, the outer rigid housing, and the inner rigid member providing the first variable volume fluid pumping chamber 62 proximate the second strut end 26 and the second track entrance end 38. The third inner end tubular elastomer, the first outer tubular spring elastomer, the outer rigid housing, and the inner rigid member preferably providing the distal second variable volume fluid pumping chamber 64 distal and opposite from the first variable volume fluid pumping chamber and proximate the first strut end 24 and the first track entrance end 38. The movement of the first strut end member 24 in the first strut longitudinal direction 100 towards the second strut end member 26 plungers and pumps the liquid 60 from the second variable volume chamber 64 into the track 34 towards the first variable volume chamber 62, and the opposite movement 101 of the first strut end member in the second longitudinal direction 101 away from the second strut end plungers and pumps the liquid from the first variable volume chamber through the track towards the second variable volume chamber. The second strut end member preferably includes the rigid structural extension extending from outside the exterior of the isolator housing, into the inner cavity 30 through the second inner end tubular elastomer and through the first variable volume chamber 64, with the double acting isolator strut having the frequency notch band and providing for structural attachments at each end of the isolator with the direct load path through the isolator's inner and outer rigid structural members and the in between spring 40 to support the axial loads, preferably with the static spring stiffness of at least 3,000 lbs/inch static spring stiffness. More preferably the static spring stiffness is greater than 13,000 lbs/inch, more preferably greater than 23,000 lbs/inch, more preferably greater than 35,500 lbs/inch, and most preferably at least 45,000 lbs/inch. The isolator preferably minimizes the relative motion between the two ends while supporting the axial load and isolating the tuned frequency motion between the first and second strut ends in the tuned frequency isolation notch band. In a preferred embodiment the frequency notch band is in the range from about 10 Hz to 40 Hz. In a preferred alternative embodiment the frequency notch band in the range from about 50 Hz to 500 Hz. Preferably the frequency notch band is centered about the center frequency, with the band having the notch band width of at least 10% of the center frequency. In a preferred embodiment the frequency notch band is centered about 30 Hz with the notch band width of about 3 Hz. Preferably the isolator has the notch band depth providing at least the 50% reduction of the static spring stiffness. Preferably the isolator includes the variable volume compensator chamber 70, preferably with the spring 72.

The spring loaded compensator piston 74 and the compensator diaphragm 76 preferably allowing for thermal expansion and contraction of the fluid while minimizing the pressure change in the isolator. Preferably the variable volume compensator is nonpumping and dynamically isolated. Preferably the variable volume compensator is proximate the second variable volume chamber, and in fluid communication with the pumping chamber through the relatively small cross-section area conduit 86, compared to cross-section area Ta of the track conduit 34. Preferably the variable volume compensator chamber includes the spring loaded compensator piston 74.

In an embodiment the invention includes a support isolator. The support isolator preferably has an exterior and a longitudinally extending axis. The isolator preferably having a first end member and a second end member, the second end opposite from the first end along the longitudinally extending axis. The isolator preferably includes an isolator fluid. The isolator first end member including an outer rigid longitudinally extending housing, the outer rigid longitudinally extending housing extending longitudinally towards the second end member, the outer rigid longitudinally extending housing defining an interior cavity, the interior cavity containing a first variable volume fluid chamber proximate the second end and a distal second variable volume fluid chamber proximate the first end. The isolator second end member includes a rigid structural extension longitudinally extending from the isolator exterior into the interior cavity through the first variable volume chamber, the rigid structural extension including an inner rigid member, the inner rigid member including an inertial fluid track extending in a direction from the first end towards the second end, the inertial fluid track having a first entrance end in fluid communication with the second variable volume chamber and a second entrance end in fluid communication with the first variable volume chamber. The isolator preferably having a spring between the inner rigid member and the outer rigid housing providing a high static spring stiffness of at least 3,000 lbs/inch, wherein a movement of the first end member in a first longitudinal direction towards the second end member plungers the fluid from the second variable volume chamber through the track towards the first variable volume chamber, and an opposite movement of the first end member in a second longitudinal direction away from the second end plungers the fluid from the first variable volume chamber through the track towards the second variable volume chamber.

In an embodiment the invention includes the support isolator 22. The isolator 22 has an exterior and a longitudinally extending axis 21. The isolator 22 preferably having the first end member 24 and the second end member 26, the second end 26 opposite from the first end 24 along the longitudinally extending axis 21. The isolator 22 includes the isolator fluid 60. The first end member 24 includes the outer rigid longitudinally extending housing 28, the outer rigid longitudinally extending housing 28 extending longitudinally towards the second end member 26, with the outer rigid longitudinally extending housing 28 defining the interior cavity 30. The interior cavity 30 contains the first variable volume fluid chamber 62 proximate the second end and the distal second variable volume fluid chamber 64 proximate the first end. The second end member includes the rigid structural extension 27 longitudinally extending from the isolator exterior into the interior cavity 30 through the first variable volume chamber 62. The rigid structural extension inner rigid member including the inertial fluid track 34 extending in the direction from the first end towards the second end, the inertial fluid track having the first entrance end in fluid communication with the second variable volume chamber and the second entrance end in fluid communication with the first variable volume chamber. The outer tubular spring 40 between the inner rigid member 32 and the outer rigid housing 28 preferably provide the high static spring stiffness of at least 3,000 lbs/inch, wherein the movement of the first end member in the first longitudinal direction 100 towards the second end member plungers the fluid 60 from the second variable volume chamber through the track 34 towards the first variable volume chamber, and the opposite movement of the first end member in the second longitudinal direction 101 away from the second end plungers the fluid from the first variable volume chamber through the track towards the second variable volume chamber. Preferably the outer tubular spring 40 between the inner rigid member 32 and the outer rigid housing 28 provide a supporting static spring stiffness greater than 13,000 lbs/inch, more preferably greater than 23,000 lbs/inch, more preferably greater than 35,500 lbs/inch, and most preferably at least 45,000 lbs/inch.

In an embodiment the invention includes an aircraft suspension system for isolating an aircraft power unit having at least one aircraft power unit operation frequency. The aircraft suspension system preferably includes at least one isolated suspension support strut, wherein the isolated suspension support strut includes a tuned isolator fluid inertial track with a tuned frequency isolation notch band, the frequency notch band centered about a center frequency, and having a notch band width, with the notch band width encompassing the power unit operation frequency.

Figure 15:
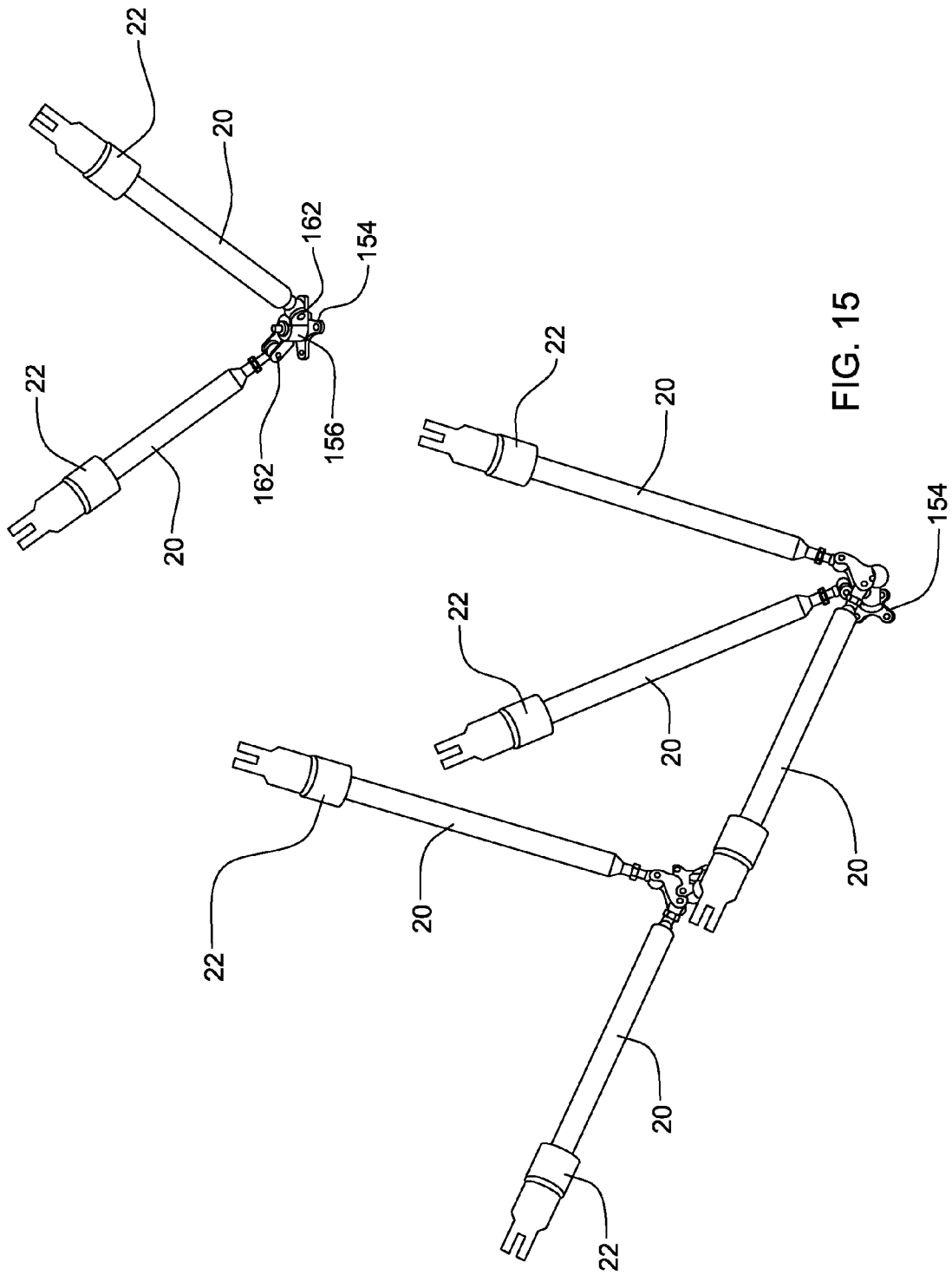
FIG. 15 shows a view of an aircraft suspension system for isolating an aircraft power unit.

In an embodiment the invention includes an aircraft suspension system for isolating an aircraft power unit. As shown in FIGS. 11-15, the aircraft suspension system preferably includes the support struts 20 with the strut isolators 22. As shown in FIGS. 11-15, the aircraft suspension system preferably is an aircraft auxiliary power unit suspension system 120 for isolating the aircraft auxiliary power unit 122 having a the center of gravity 124 and at least one aircraft auxiliary power unit operation frequency. Preferably the at least one aircraft auxiliary power unit operation frequency is a high turbine operation frequency-turbine. The aircraft auxiliary power unit suspension system 120 for isolating an aircraft auxiliary power unit 122 having at least one aircraft auxiliary power unit operation frequency and a center of gravity 124 includes at least one longitudinal suspension isolator support strut 20 with the strut isolator 22. Preferably the aircraft auxiliary power unit suspension system 120 for isolating the aircraft auxiliary power unit 122 has a plurality of longitudinal suspension isolator support struts 20 with the tuned strut isolators 22. Preferably the aircraft auxiliary power unit suspension system 120 is a focalized system. In an embodiment the aircraft auxiliary power unit suspension system is partially focalized. In an embodiment the aircraft auxiliary power unit suspension system is a fully focalized system. Preferably the aircraft auxiliary power unit suspension system 120 isolates an aircraft auxiliary power unit 122 with a first low operation frequency of a generator 128, and a second high operation frequency of a turbine 130. Preferably with the first low operation frequency is the generator operation frequency and the second high operation frequency is the turbine operation frequency. The aircraft auxiliary power unit suspension system 120 includes the longitudinal suspension isolator support struts 20 with the strut isolator 22. As shown in FIGS. 11-14, the aircraft auxiliary power unit suspension system 120 includes longitudinal suspension isolator support struts 20 with the strut isolator 22. The aircraft auxiliary power unit suspension system 120 includes the at least one longitudinal fluid isolated suspension support strut 20 with the tuned isolator fluid inertial track path 34 having the tuned frequency isolation notch band, with the frequency notch band centered about the center frequency, and having the notch band width, with the notch band width encompassing the at least one power unit operation frequency. As shown in FIG. 15 the plurality of struts 20 are preferably attached to the power unit 122 and turbine 130 with brackets 154, preferably with a clevis member 156 with clevises 162.

In an embodiment the invention includes an aircraft suspension system for isolating an aircraft motive power unit having at least one aircraft motive power unit operation frequency. Preferably the aircraft power unit suspension system includes at least one longitudinal isolated suspension strut, wherein the isolated suspension strut includes a strut isolator having a tuned isolator fluid inertial track path with a tuned frequency isolation notch band, the tuned frequency isolation notch band centered about a center notch frequency, and having a notch band width, with the notch band width encompassing the at least one aircraft motive power unit operation frequency.

Figure 16:
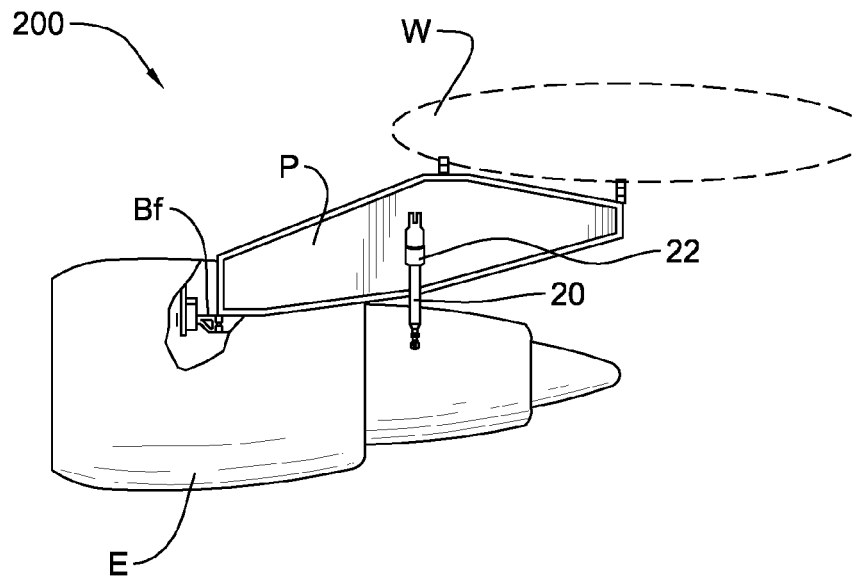
FIG. 16 shows a view of an aircraft suspension system for isolating an aircraft power unit.
Figure 17:
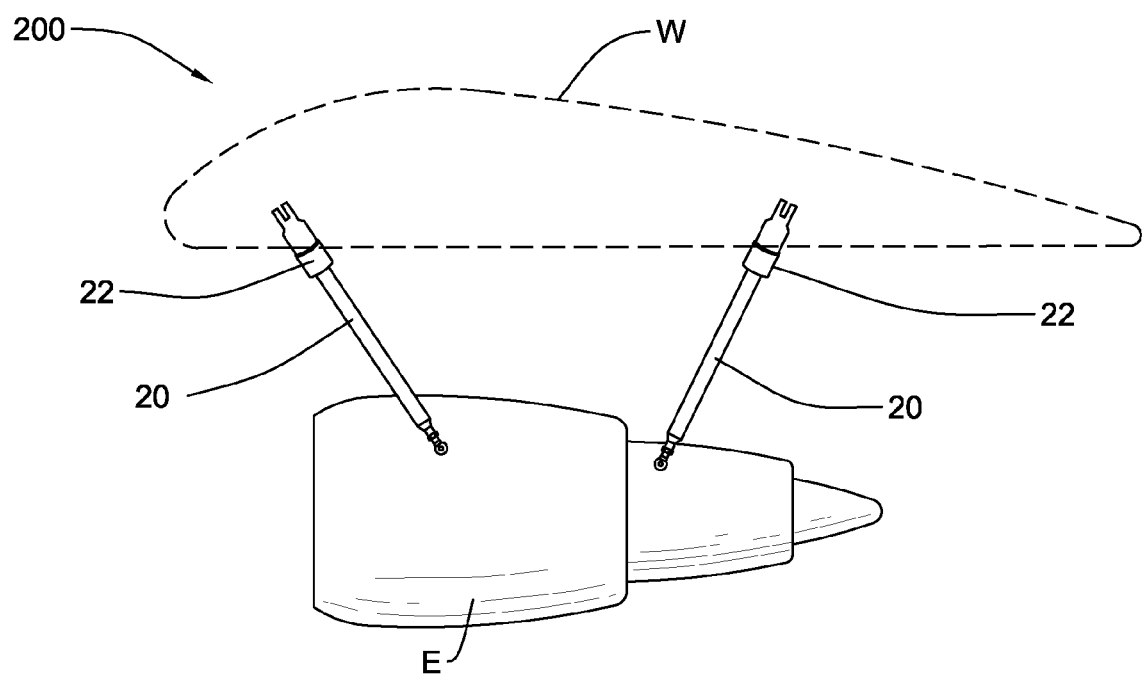
FIG. 17 shows a view of an aircraft suspension system for isolating an aircraft power unit.

In an embodiment the invention includes an aircraft suspension system for isolating an aircraft power unit. As shown in FIGS. 16-17 the aircraft suspension system preferably includes at least one support strut 20 with the strut isolators 22. As shown in FIGS. 16-17, the aircraft suspension system preferably is an aircraft motive power unit suspension system 200 for isolating the aircraft motive power unit E having the at least one aircraft motive power unit turbine operation frequency. The aircraft power unit suspension system 200 includes at least one longitudinal fluid isolated suspension strut 20, wherein said isolated suspension strut 20 includes the strut isolator 22 having a tuned isolator fluid inertial track path 34 with a tuned frequency isolation notch band, with the tuned frequency isolation notch band centered about a center notch frequency, and having a notch band width, with the notch band width encompassing the at least one aircraft motive power unit operation frequency. As shown in FIG. 16 in phantom lines the wing W of an aircraft extending laterally outward from the fuselage thereof which contains the airplane cabin, is a pylon P that depends below and extends forwardly of the leading edge of the wing W for mounting thereto an turbine motive power engine E, such as a high bypass turbofan engine. The engine E is secured to the wing pylon P by fore engine mounting bracket assembly Bf and aft mounted suspension strut 20 with isolator 22. As shown in FIG. 17 the motive power turbine engine unit E is suspended from the wing W by a least two of the support struts 20 with the isolators 22.

In an embodiment the invention includes the method of making the isolator 22. The method preferably includes providing an outer rigid housing, the outer rigid housing defining an inner cavity. The method preferably includes providing an inner rigid member, the inner rigid member including an inertial fluid track extending in a direction from a first end towards a second end, the inertial fluid track having a first entrance end proximate the first end and a second entrance end proximate the second end. The method preferably includes disposing the inner rigid member inside the outer rigid housing with the inner rigid member extending into the outer rigid housing inner cavity, with a first outer tubular elastomer disposed between the outer rigid housing and the inner rigid member, a second inner end tubular elastomer, the second inner end tubular elastomer disposed between the outer rigid housing and the inner rigid member proximate the second end, the second inner end tubular elastomer, the first outer tubular elastomer, the outer rigid housing, and the inner rigid member providing a first variable volume fluid chamber proximate the second track entrance end. Preferably a third inner end tubular elastomer is disposed between the outer rigid housing and the inner rigid member proximate the first end and provides a distal second variable volume fluid chamber proximate the first end. The method preferably includes providing an isolator fluid wherein a first direction movement plungers the fluid from the second variable volume chamber through the track towards the first variable volume chamber, and a second opposite direction movement plungers the fluid from the first variable volume chamber through the track towards the second variable volume chamber. Providing the inner rigid member preferably includes providing the inner rigid member with a track core receiver, and selecting a track core modular insert and receiving the selected track core modular insert in the inner rigid member track core receiver. Receiving the selected track core modular insert in the inner rigid member track core receiver preferably includes tuningly orienting the selected track core modular insert in the inner rigid member track core receiver. Preferably the first variable volume fluid chamber has a first chamber plunger pumping area and the second variable volume fluid chamber has a second chamber plunger pumping area, and the inertial fluid track has a cross-sectional area less than the first chamber plunger pumping area and the second chamber plunger pumping area. Preferably the method includes providing the variable volume compensator chamber in fluid communication with said inertial fluid track and dynamically isolating the variable volume compensator chamber.

In an embodiment the invention includes the method of making the isolated longitudinal support strut 20. The method preferably includes providing an outer rigid housing having an exterior and a longitudinally extending axis, the outer rigid housing defining an inner cavity. The method preferably includes disposing an inner rigid member in the outer rigid housing inner cavity, the inner rigid member including an inertial fluid track extending in a direction from a first end towards a second end, the inertial fluid track having a first entrance end proximate the first end and a second entrance end proximate the second end, with the inner cavity containing a first variable volume fluid chamber proximate the second end and a distal second variable volume fluid chamber proximate the first end, the inner rigid member including a rigid structural external extension longitudinally extending from the inner cavity through the first variable volume chamber and externally out towards the exterior. Preferably a spring between the inner rigid member and the outer rigid housing provides a high static spring stiffness of at least 3,000 lbs/inch.

The method preferably includes providing an isolator fluid wherein a first longitudinal strut direction movement plungers the fluid from the second variable volume chamber through the track towards the first variable volume chamber, and an opposite longitudinal strut direction movement plungers the fluid from the first variable volume chamber through the track towards the second variable volume chamber. Preferably the inner rigid member includes the track core receiver, and the method includes selecting a track core modular insert and receiving the selected track core modular insert in the inner rigid member track core receiver. Preferably receiving the selected track core modular insert in the inner rigid member track core receiver includes tuningly orienting the selected track core modular insert in the inner rigid member track core receiver, preferably by rotating its orientation on the receiver. Preferably the first variable volume fluid chamber has a first chamber plunger pumping area and the second variable volume fluid chamber has a second chamber plunger pumping area, and the selected received track core modular insert has a cross-sectional area less than the first chamber plunger pumping area and the second chamber plunger pumping area. Preferably the method includes providing the variable volume compensator chamber in fluid communication with the inertial fluid track, the first variable volume fluid chamber, and the second variable volume fluid chamber through the compensator conduit having a compensator conduit cross-section area less than said selected received track core modular insert cross-sectional area. Preferably the selected track core modular insert provides an isolator notch band depth providing at least a 50% reduction of the high static spring stiffness.

Figure 18:
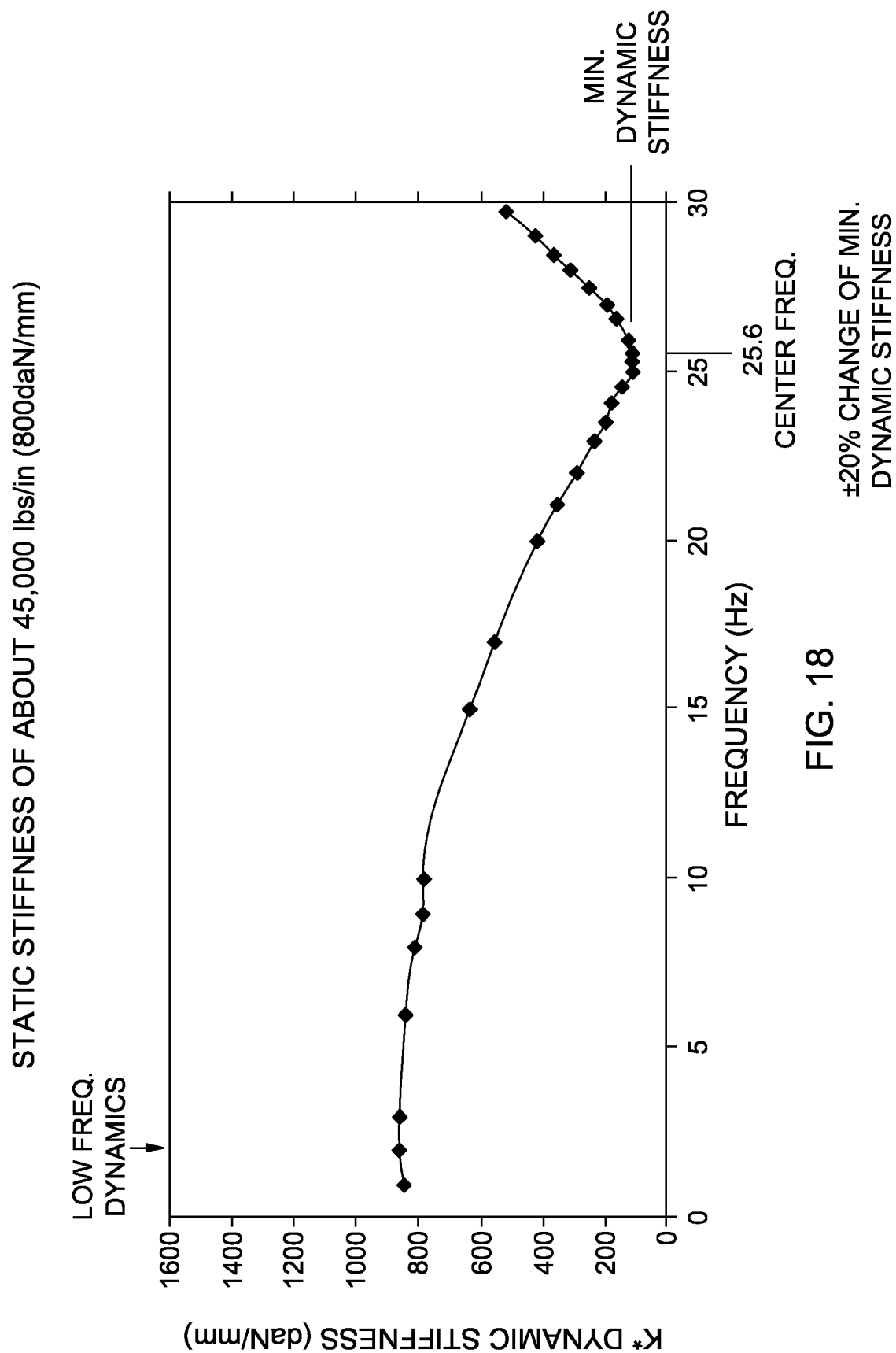
FIG. 18 shows a plot of K* Dynamic Stiffness (decaNewtons per mm) vs. Frequency (Hz) for an isolator strut with a static stiffness of about 45,000 lbs/in (about 800 decaNewtons per mm).

The isolator 22 preferably uses the inertial force of the fluid 60 to minimize and cancel vibrations between the two ends 24 and 26 at specific tuned vibration frequencies, with the track 34 preferably tuned to a troublesome operation center frequency that is preferably isolated while the strut 20 supports an axial load along its axis 21. The isolator is preferably double acting and provides structural attachment at each end of the isolator 22 with direct load paths through the outer tubular elastomer spring 40 and the first strut end 24 and the second strut end 26, that provides a high spring stiffness in series with isolation. The inertial forces of the liquid 60 oscillating in the track 34 cancel vibrations at the specifically tuned frequency of operation of operating vibrating power equipment units. FIG. 18 shows the benefits of a strut isolator 22 with a static spring stiffness of about 45,000 lbs/inch (greater than 800 decaNewtons per mm), with a tuned frequency isolation notch band with a tuned center frequency of about 25.6 Hz, with a minimum dynamic stiffness less than 200 decaNewtons per mm, with a notch band width of at least ±10% of the center frequency, preferably at least about ±20% of the center frequency. The strut isolator performance results shown in FIG. 18 illustrate that the isolator was tuned to center frequency of about 25.6 Hz to provide a minimum dynamic stiffness less than 200 decaNewtons per mm which is an at least 50% reduction from the about 800 decaNewtons per mm high static spring stiffness, and preferably provides at least a 60% reduction from the 800 decaNewtons per mm (below 320 decaNewtons per mm), preferably at least a 70% reduction (below 320 decaNewtons per mm), and preferably at least a 75% reduction (below 200 decaNewtons per mm) of the high static spring stiffness.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

The invention claimed is:

1. A support strut for supporting an axial load, said support strut including a strut isolator, said strut isolator having a first strut end member and a second strut end member, said second strut end distal from said first strut end, said first strut end member including an outer rigid housing, said outer rigid housing defining an inner cavity, said second strut end member including an inner rigid member, said inner rigid member extending into said outer rigid housing inner cavity, said inner rigid member including an inertial track extending in a direction from said first strut end towards said second strut end, said inertial track having a first entrance end proximate said first strut end and a second entrance end proximate said second strut end, a first outer tubular elastomer disposed between said outer rigid housing and said inner rigid member, said first outer tubular elastomer bonded to a first inner rigid surface of said outer rigid housing, said first outer tubular elastomer bonded to a first outer rigid surface of said inner rigid member, said first outer tubular elastomer having an inner diameter ID, a second inner end tubular elastomer, said second inner end tubular elastomer disposed between said outer rigid housing and said inner rigid member proximate said second strut end, said second inner end tubular elastomer bonded to a second inner rigid surface of said outer rigid housing, said second inner end tubular elastomer bonded to a second outer rigid surface of said inner rigid member, said second inner end tubular elastomer having an second outer diameter OD2, a third inner end tubular elastomer, said third inner end tubular elastomer disposed between said outer rigid housing and said inner rigid member proximate said first strut end, said third inner end tubular elastomer bonded to a third inner rigid surface of said outer rigid housing, said third inner tubular elastomer bonded to a third outer rigid surface of said inner rigid member, said third inner end tubular elastomer having a third outer diameter OD3, an isolator fluid, said second outer diameter OD2 and said third outer diameter OD3 less than said inner diameter ID, wherein said second inner end tubular elastomer, said first outer tubular elastomer, said outer rigid housing, and said inner rigid member providing a first variable volume fluid chamber proximate said second strut end and said second track entrance end, said third inner end tubular elastomer, said first outer tubular elastomer, said outer rigid housing, and said inner rigid member providing a second variable volume fluid chamber proximate said first strut end and said first track entrance end, wherein a movement of said first strut end member in a first strut direction towards said second strut end member plungers said fluid from said second variable volume chamber through said track towards said first variable volume chamber, and an opposite movement of said first strut end member in a second direction away from said second strut end plungers said fluid from said first variable volume chamber through said track towards said second variable volume chamber.

2. A support strut as claimed in claim 1, wherein said isolator strut includes a variable volume compensator chamber.

3. A support strut as claimed in claim 1, wherein said isolator strut includes a variable volume fluid thermal expansion compensator chamber proximate said second variable volume chamber.

4. A support strut as claimed in claim 1, wherein said isolator strut includes a variable volume fluid thermal expansion compensator chamber with a pressure indicator.

* * * * *